(12) United States Patent
Wu

(10) Patent No.: US 9,619,531 B2
(45) Date of Patent: Apr. 11, 2017

(54) DEVICE, METHOD AND USER INTERFACE FOR DETERMINING A CORRELATION BETWEEN A RECEIVED SEQUENCE OF NUMBERS AND DATA THAT CORRESPONDS TO METRICS

(71) Applicant: Lithium Technologies, Inc., Emeryville, CA (US)

(72) Inventor: Michael Wu, Oakland, CA (US)

(73) Assignee: Lithium Technologies, Inc., San Francisco, CA (US)

( * ) Notice: Subject to any disclaimer, the term of this patent is extended or adjusted under 35 U.S.C. 154(b) by 261 days.

(21) Appl. No.: 14/098,492

(22) Filed: Dec. 5, 2013

(65) Prior Publication Data

US 2014/0181087 A1    Jun. 26, 2014

Related U.S. Application Data

(60) Provisional application No. 61/734,927, filed on Dec. 7, 2012.

(51) Int. Cl.
*G06F 17/30* (2006.01)
*G06F 3/0481* (2013.01)
(Continued)

(52) U.S. Cl.
CPC ...... *G06F 17/30554* (2013.01); *G06F 3/0481* (2013.01); *G06F 3/04842* (2013.01); *G06F 17/30994* (2013.01); *G06Q 50/01* (2013.01)

(58) Field of Classification Search
CPC ......... G06F 17/30023; G06F 17/30548; G06F 17/30749; G06F 17/30825; G06F 17/30988;
(Continued)

(56) References Cited

U.S. PATENT DOCUMENTS 6,707,454 B1    3/2004    Barg et al.
8,006,187 B1 *  8/2011    Bailey ............... G06Q 10/10
                                              715/733
(Continued)

OTHER PUBLICATIONS

Bostock, Mike, Sankey Diagram, available at http://bost.ocks.org/mike/sankey, published May 21, 2012, last accessed Sep. 18. 2015, 1 pg.

(Continued)

*Primary Examiner* — Syed Hasan
*Assistant Examiner* — Saba Ahmed
(74) *Attorney, Agent, or Firm* — Morgan, Lewis & Bockius LLP

(57) ABSTRACT

A device with one or more processors and memory receives, from a first party, an input including a sequence of numbers corresponding to a plurality of key performance indicator values associated with an entity and time range information for the sequence of numbers. In response to receiving the input, the device obtains, from a data set associated with the entity, data that corresponds to a plurality of metrics in accordance with the time range information, wherein the data set is accessible to a second party that does not have direct knowledge of the key performance indicators and determines correlations between the plurality of metrics and the sequence of numbers. The device provides, to the first party, a result indicative of a respective correlation between one or more of the metrics and the sequence of numbers.

17 Claims, 41 Drawing Sheets

(51) Int. Cl.
    *G06F 3/0484* (2013.01)
    *G06Q 50/00* (2012.01)
(58) Field of Classification Search
    CPC ......... G06F 17/30044; G06F 17/30725; G06F 17/30876; G06F 17/30604; G06F 17/30554; G06F 17/30994; G06F 3/04842; G06F 3/0481; G06Q 50/01
    USPC ........................................................ 707/722
    See application file for complete search history.

(56) References Cited

U.S. PATENT DOCUMENTS

| | | | |
|---|---|---|---|
| 9,021,361 B1 | 4/2015 | Pettinati et al. | |
| 2002/0070953 A1* | 6/2002 | Barg ................ | G06Q 30/02 715/700 |
| 2003/0128203 A1* | 7/2003 | Marshall ............. | G06T 17/20 345/419 |
| 2004/0174397 A1 | 9/2004 | Cereghini et al. | |
| 2005/0206644 A1* | 9/2005 | Kincaid ............. | G06T 11/206 345/440 |
| 2007/0171716 A1* | 7/2007 | Wright ............... | G06T 11/206 365/185.12 |
| 2007/0286528 A1* | 12/2007 | Podilchuk ......... | G06F 17/30277 382/305 |
| 2008/0294680 A1 | 11/2008 | Powell et al. | |
| 2009/0089657 A1 | 4/2009 | Davis | |
| 2010/0119053 A1 | 5/2010 | Goeldi | |
| 2010/0287512 A1 | 11/2010 | Gan et al. | |
| 2011/0153603 A1* | 6/2011 | Adiba ............... | G06F 17/30548 707/737 |
| 2012/0284155 A1 | 11/2012 | Holten et al. | |
| 2014/0067520 A1* | 3/2014 | Campanile ......... | G06Q 30/0243 705/14.42 |
| 2014/0200989 A1* | 7/2014 | Cohen Kassko .. | G06Q 30/0243 705/14.42 |

OTHER PUBLICATIONS

Lithium Technologies, Inc., International Preliminary Report on Patentability, PCT/US2013/073625, Jun. 18, 2015, 7 pgs.
Minard, Charles, Carte figurative des pertes sucessives en Homes de l'armée Francaise dans la campagne de Russie 1812-1813 and translation, Nov. 20, 1869, 3 pgs.
Wu, Office Action, U.S. Appl. No. 14/098,501, Sep. 24, 2015, 20 pgs.
Wu, Office Action, U.S. Appl. No. 14/098,509, Oct. 22, 2015, 10 pgs.
Alexander Olshannikov, Book: Pivot Table Data Crunching: Microsoft® Excell® 2010, Que, Oct. 20, 2010, E-book, http://techbus.safaribooksonline.com/print?xmlid=9780789746719%2Fcopyrightp1g, 30 pgs.
PanopticonSoftwareAB, "North Sea Oil Production analysis Dashboard," Aug. 31, 2010, <URLhttps://www.youtube.com/watch?v=dC-5t6TmquQ&list=PL44D9821404AB3348&index=13/>, 10 pgs.
PanopticonSoftwareAB, "US Federal Budget Analysis Dashboard," Aug. 30, 2010, <URLhttps://www.youtube.com/watch?v jWENQKIjZik&index=15&list=PL44D9821404AB3348/>, 5 pgs.
Wu, Office Action, U.S. Appl. No. 14/098,505, Jan. 29, 2016, 13 pgs.
Wu, Office Action, U.S. Appl. No. 14/098,480, Nov. 5, 2015, 17 pgs.
Jelen, Bill and Alexander, Michael, Pivot Table Data Crunching: Microsoft Excel 2010. Que Oct. 20, 2010, E-book, 56 pgs.
Lithium Technologies, Inc., International Search Report, PCT/US2013/073625, May 28, 2014, 7 pgs.

* cited by examiner

Figure 5G correlation analysis of business KPI

Enter your business KPI here:

68934 54986 67054 58573 67856 60767
75065 77056 67054 72032

Your KPI's time grain: day  week  month  quarter    end time: now (default)

— 5038
5448
5446

1. Input the business KPI – the right hand side of the regression equation
   – Can be any quantity that a person cares about
   – People need not specify what those numbers are
2. Specify time grain + end time

5450

Figure 5T correlation analysis of business KPI

1. Input the business KPI – the right hand side of the regression equation
   – Can be any quantity that a person cares about
   – People need not specify what those numbers are
2. Specify time grain + end time

Enter your business KPI here:
68934 54986 67054 58573 67856 60767
75065 77056 67054 72032

Your KPI's time grain: day  week  month  quarter — 5452 end time: now (default)

Figure 5U correlation analysis of business KPI

1. Input the business KPI – the right hand side of the regression equation
   – Can be any quantity that a person cares about
   – People need not specify what those numbers are
2. Specify time grain + end time
3. Select the community / SMM metrics
   – Add/remove w/ 1 click

Enter your business KPI here:
68934 54986 67054 58573 67856 60767
75065 77056 67054 72032

Your KPI's time grain:   end time:
day   week   month   quarter   now (default)

Select covariate social metrics:
filter   view
  active_cast_page_view
  blog_article_view
  board_page_view
  board_thread_view
  facebook_QnA_view_count
  idea_view
  image_gallery_view
  message_view
  page_view
  wireless_total_page_view selected metrics
  facebook_QnA_view_count 5462
5464
5466
5038

Figure 5X correlation analysis of business KPI

Enter your business KPI here:

6934 54986 67054 58573 67856 60767
75065 77056 67054 72032

Your KPI's time grain:     end time:
day   week   month   quarter   now (default)

Select covariate social metrics:

filter: view active_cast_page_view
blog_article_view
board_page_view
board_thread_view
facebook_QnA_view_count
idea_view
image_gallery_view
message_view
page_view
wireless_total_page_view — 5038

5466 ⌐ 5468 selected metrics
✕ facebook_QnA_view_count
✕ page_view

⎫
⎬ 5464
⎭

1. Input the business KPI – the right hand side of the regression equation
   – Can be any quantity that a person cares about
   – People need not specify what those numbers are
2. Specify time grain + end time
3. Select the community / SMM metrics
   – Add/remove w/ 1 click

Figure 5Y correlation analysis of business KPI

1. Input the business KPI – the right hand side of the regression equation
   - Can be any quantity that a person cares about
   - People need not specify what those numbers are
2. Specify time grain + end time
3. Select the community / SMM metrics
   - Add/remove w/ 1 click

Enter your business KPI here:
68934 54986 67054 58573 67856 60767
75065 77056 67054 72032

Your KPI's time grain: day  week  month  quarter    end time: now (default)

Select covariate social metrics: 5500 selected metrics
- facebook_QnA_view_count
- page_view
- wireless_total_page_view — 5038 filter  view
- active_cast_page_view
- blog_article_view
- board_page_view
- board_thread_view
- facebook_QnA_view_count
- idea_view
- image_gallery_view
- message_view
- page_view
- wireless_total_page_view

— 5468

— 5464

Figure 5Z correlation analysis of business KPI

1. Input the business KPI – the right hand side of the regression equation
   - Can be any quantity that a person cares about
   - People need not specify what those numbers are
2. Specify time grain + end time
3. Select the community / SMM metrics
   - Add/remove w/ 1 click

Enter your business KPI here:
```
68934 54986 67054 58573 67856 60767
75065 77056 67054 72032
```

Your KPI's time grain: day  week  month  quarter end time: now (default)

Select covariate social metrics:

filter: view

- active_cast_page_view
- blog_article_view
- board_page_view
- board_thread_view
- facebook_QnA_view_count
- idea_view
- image_gallery_view
- message_view
- page_view
- wireless_total_page_view selected metrics:
- facebook_QnA_view_count
- wireless_total_page_view

} 5464

Figure 5AA correlation analysis of business KPI

1. Input the business KPI – the right hand side of the regression equation
   - Can be any quantity that a person cares about
   - People need not specify what those numbers are
2. Specify time grain + end time
3. Select the community / SMM metrics
   - Add/remove w/ 1 click

Enter your business KPI here:
68934 54986 67054 58573 67856 60767
75065 77056 67054 72032

Your KPI's time grain:      end time:
day    week    month    quarter      now (default)

Select covariate social metrics:
filter    accepted
accepted_solution — 5038
accepted_solution_view
author_accepted_solution
self_solved_accepted_solution
5470 selected metrics
☒ facebook_OnA_view_count
☒ wireless_total_page_view 5454
5458
5456
5460
5464

Figure 5BB correlation analysis of business KPI

1. Input the business KPI – the right hand side of the regression equation
   - Can be any quantity that a person cares about
   - People need not specify what those numbers are
2. Specify time grain + end time
3. Select the community / SMM metrics
   - Add/remove w/ 1 click + drag & drop too

Enter your business KPI here:

68934 54986 67054 58573 67856 60767
75065 77056 67054 72032

Your KPI's time grain:     end time:
day   week   month   quarter     now (default)

Select covariate social metrics:

filter   accepted accepted_solution
accepted_solution_view
author_accepted_solution
self_solved_accepted_solution selected metrics
☒ facebook_QnA_view_count
☒ wireless_total_page_view
☒ accepted_solution_view

5038

5464

5470

Figure 5CC correlation analysis of business KPI

1. Input the business KPI – the right hand side of the regression equation
   - Can be any quantity that a person cares about
   - People need not specify what those numbers are
2. Specify time grain + end time
3. Select the community / SMM metrics
   - Add/remove w/ 1 click + drag & drop too

Enter your business KPI here:
68934 54986 67054 58573 67856 60767
75065 77056 67054 72032

Your KPI's time grain: day  week  month  quarter       end time: now (default)

Select covariate social metrics:

filter  search advanced_search_queries
board_search
category_search
current_research_board_post
current_researcherID_post
community_search
facebook_qa_search
search_with_result — 5038
twitter_stream_search 5484
5486 selected metrics
☒ facebook_QnA_view_count
☒ wireless_total_page_view
☒ accepted_solution_view
☒ facebook_qa_kudos_count
☒ unique_visitor_count
☒ sessions
☒ mobile_post
☒ post_count
☒ post_with_kudos
☒ community_search

5464

Figure 5DD correlation analysis of business KPI

1. Input the business KPI – the right hand side of the regression equation
   - Can be any quantity that a person cares about
   - People need not specify what those numbers are
2. Specify time grain + end time
3. Select the community / SMM metrics
   - Add/remove w/ 1 click + drag & drop too

Enter your business KPI here:

68934 54986 67054 58573 67856 60767
75065 77056 67054 72032

Your KPI's time grain:
day   week   month   quarter end time:
now (default)

Select covariate social metrics:

filter: search advanced_search_queries
board_search
category_search
current_research_board_post
current_researcherID_post
community_search
facebook_qa_search
search_without_result
twitter_stream_search selected metrics
- facebook_QnA_view_count
- wireless_total_page_view
- accepted_solution_view
- facebook_qa_kudos_count
- unique_visitor_count
- sessions
- mobile_post — 5038
- post_count
- post_with_kudos
- community_search

5488

5504

5502

5486

Figure 5EE correlation analysis of business KPI

1. Input the business KPI — the right hand side of the regression equation
   - Can be any quantity that a person cares about
   - People need not specify what those numbers are
2. Specify time grain + end time
3. Select the community / SMM metrics
   - Add/remove w/ 1 click + drag & drop too

Enter your business KPI here:

68934 54986 67054 58573 67856 60767
75065 77056 67054 72032

Your KPI's time grain: day  week  month  quarter    end time: now (default)

Select covariate social metrics:

filter search advanced_search_queries
board_search
category_search
current_research_board_post
current_researcherID_post
community_search
facebook_qa_search
search_with_result  5038
twitter_stream_search selected metrics facebook_QnA_view_count
wireless_total_page_view
accepted_solution_view
facebook_qa_kudos_count
unique_visitor_count
mobile_post
post_count
post_with_kudos
community_search

5464

Figure 5FF correlation analysis of business KPI

1. Input the business KPI – the right hand side of the regression equation
   - Can be any quantity that a person cares about
   - People need not specify what those numbers are
2. Specify time grain + end time
3. Select the community / SMM metrics
   - Add/remove w/ 1 click + drag & drop too

Enter your business KPI here:

68934 54986 67054 58573 67856 60767
75065 77056 67054 72032

Your KPI's time grain:     end time:
day   week   month   quarter     now (default)

Select covariate social metrics:

filter   search advanced_search_queries
board_search
category_search
current_research_board_post
current_researcherID_post
community_search
facebook_qa_search
search_without_result
twitter_stream_search selected metrics
▓ facebook_QnA_view_count
▓ wireless_total_page_view
▓ accepted_solution_view
▓ facebook_qa_kudos_count
▓ unique_visitor_count
▓ mobile_post
▓ post_count
▓ post_with_kudos
▓ community_search
▓ facebook_qa_search

DEVICE, METHOD AND USER INTERFACE FOR DETERMINING A CORRELATION BETWEEN A RECEIVED SEQUENCE OF NUMBERS AND DATA THAT CORRESPONDS TO METRICS

RELATED APPLICATIONS

This application claims priority to U.S. Provisional Patent Application No. 61/734,927, filed Dec. 7, 2012, entitled "Systems and Methods for Presenting Analytic Data" which is incorporated herein by reference in its entirety.

This application is related to the following applications: U.S. patent application Ser. No. 14/098,480, "Device, Method and User Interface for Presenting Analytic Data," filed Dec. 5, 2013, U.S. patent application Ser. No. 14/098,501, "Device, Method and User Interface for Displaying Relationships between Different Sets of Data," filed Dec. 5, 2013, U.S. patent application Ser. No. 14/098,505, "Device, Method and User Interface for Switching between Graphical Representations of Data," filed Dec. 5, 2013, and U.S. patent application Ser. No. 14/098,509, "Device, Method and User Interface for Emphasizing Divisions in Data," filed Dec. 5, 2013, which are incorporated by reference herein in their entirety.

TECHNICAL FIELD

The disclosed implementations relate generally to methods of data visualization.

BACKGROUND

An online community is a website designed for users to interact with each other, usually with some common theme. Unlike a traditional website, in which the website owner controls all of the content, an online community enables and encourages users to participate in the content. Users post comments, replies to comments, questions, and answers to other users' questions; more experienced users develop articles and knowledge bases, and lead forum discussions or blogs.

Business entities now recognize the value of having an online community for the business. In this case, the community focus is on the products or services of the business, and users participate in the community just like any other online community. While online communities can be beneficial for marketing, online communities are not just a marketing gimmick. For example, real users post real questions, and the questions are frequently answered by other users in the community. Of course an online community is much more than just a question and answer board.

SUMMARY

It is import to measure the success and "health" of an online community. To make these measurements, an abundance of data is tracked about user interactions with the community. Every interaction is tracked, as well as information about the interaction, such as where it originated, what time, what type of computing device the user was using, the content of the interaction itself (such as a post), as well as subsequent responses to the interaction, such as other users designating the comment or answer as useful. This abundance of data is almost too much, and previous methods of reviewing the data have been cumbersome or ineffective. Because of the shortcoming of previous attempts, implementations of the present invention provide simpler and more effective ways of reviewing interaction data for an online community.

In some implementations, a method includes, at a computing device with one or more processors and memory, receiving, from a first party, an input including a sequence of numbers corresponding to a plurality of key performance indicator values associated with an entity; and time range information for the sequence of numbers. The method further includes, in response to receiving the input: obtaining, from a data set associated with the entity, data that corresponds to a plurality of metrics in accordance with the time range information, where the data set is accessible to a second party that does not have direct knowledge of the key performance indicators; determining correlations between the plurality of metrics and the sequence of numbers, where a correlation between a respective metric and the sequence of numbers is determined based on a comparison between data corresponding to the respective metric and the sequence of numbers; and providing, to the first party, a result indicative of a respective correlation between one or more of the metrics and the sequence of numbers.

In accordance with some embodiments, a computer system (e.g., a search client system or search server system) includes one or more processors, memory, and one or more programs; the one or more programs are stored in the memory and configured to be executed by the one or more processors and the one or more programs include instructions for performing the operations of the method described above. In accordance with some embodiments, a non-transitory computer readable storage medium has stored therein instructions which when executed by one or more processors, cause a computer system (e.g., a search client system or search server system) to perform the operations of the methods described above.

BRIEF DESCRIPTION OF THE DRAWINGS

Like reference numerals refer to corresponding parts throughout the several views of the drawings.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the implementations.

Figure 1:
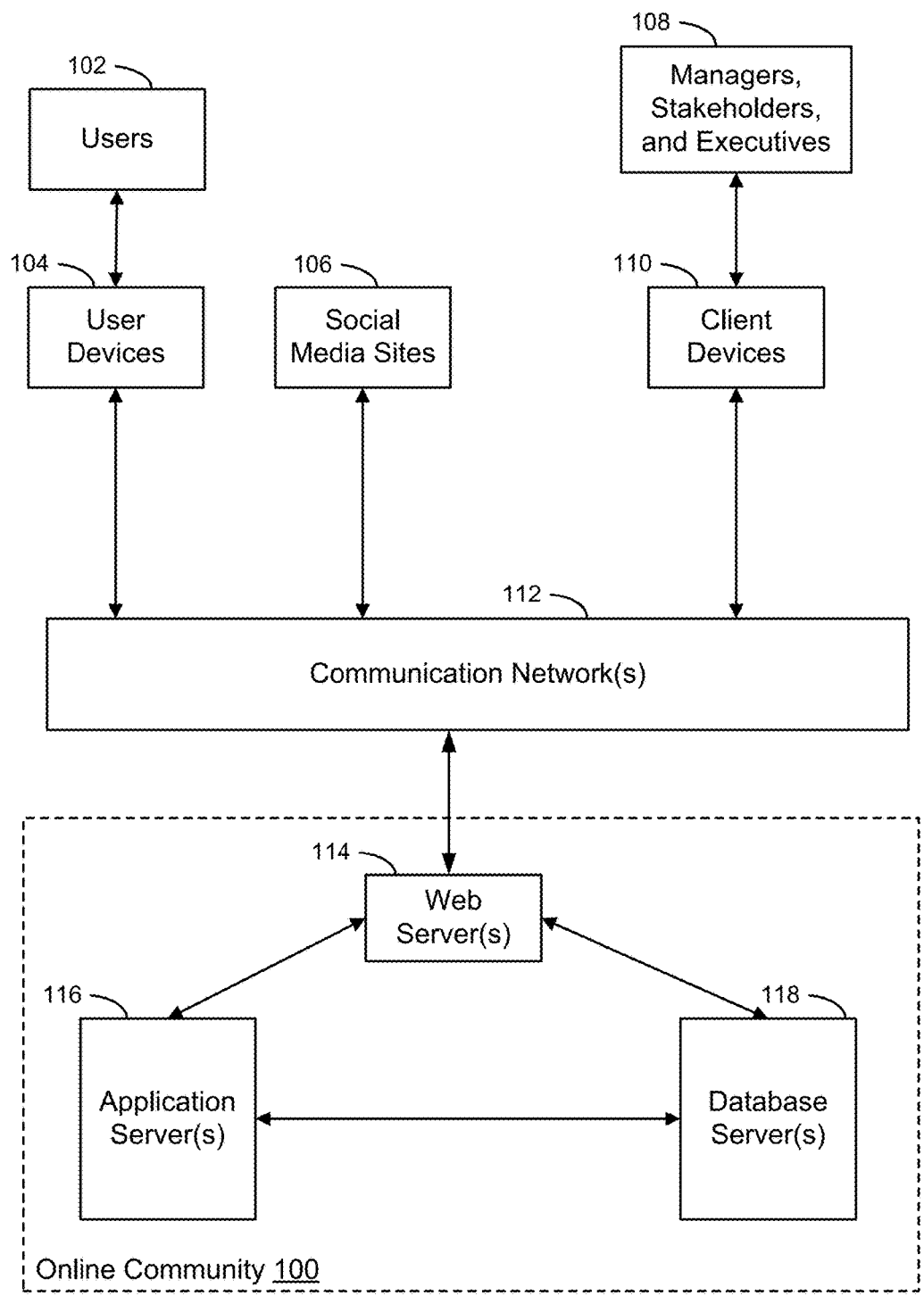
FIG. 1 is a conceptual block diagram of an online community in accordance with some implementations.

FIG. 1 illustrates an example of an environment in which disclosed implementations operate. In the middle is one or more communication networks 112, such as the Internet, that link together the various computing devices. Users 102 are individual people who access the communication networks 112 using electronic devices 104, such as desktop computers, laptop computers, tablet computers, smartphones, PDA's, etc. The communication networks are also connected to one or more Social Media sites 106, such as Facebook, Youtube, etc.

Also connected to the communication network 112 is an online community 100 for a business entity. An online community 100 provides public forums, bulletin boards, blogs, and other information. Unlike a traditional business website, an online community is maintained by everyone, including the users 102. Users 102, for example, can post questions about products or services provided by the business entity, or can post answers to other users questions. An online community can increase profitability of the business entity in many ways, including reducing the costs for customer support (users find the information in the community) and reducing the cost of search engine optimization (for example, because search engines review the user generated community content).

An online community 100 includes one or more web servers 114 that handle the incoming web requests, and one or more application server 116 that provide the user interface functionality for the community. The online community 100 also includes one or more database servers 118 that store the data for the community, including logs of user interactions. In some implementations, the database servers 118 also store binary files, image files, video files, and so on. In some implementations, binary, image, and video files are stored on the application servers 116, of other file servers (not shown).

In addition to the users 102 who interact directly with the online community 100, managers, stakeholders, and executives 108 of the business entity review the community interaction data. As described in more detail below, some people (e.g., managers, stakeholders and/or executives) 108 review the raw data, and other people 108 review analytic computed data. The people 108 utilize client devices 110 to access the interaction data over the communication network 112. Like a user device, a client devices can be desktop computers, laptop computers, tablet computers, smartphones, PDA's, etc.

Although FIG. 1 illustrates Web Servers 114, application servers 116, and database servers 118 as physically distinct devices, the functionality can be combined in various different ways. For example, the web server software and application server software optionally runs on the same server(s).

Figure 2:
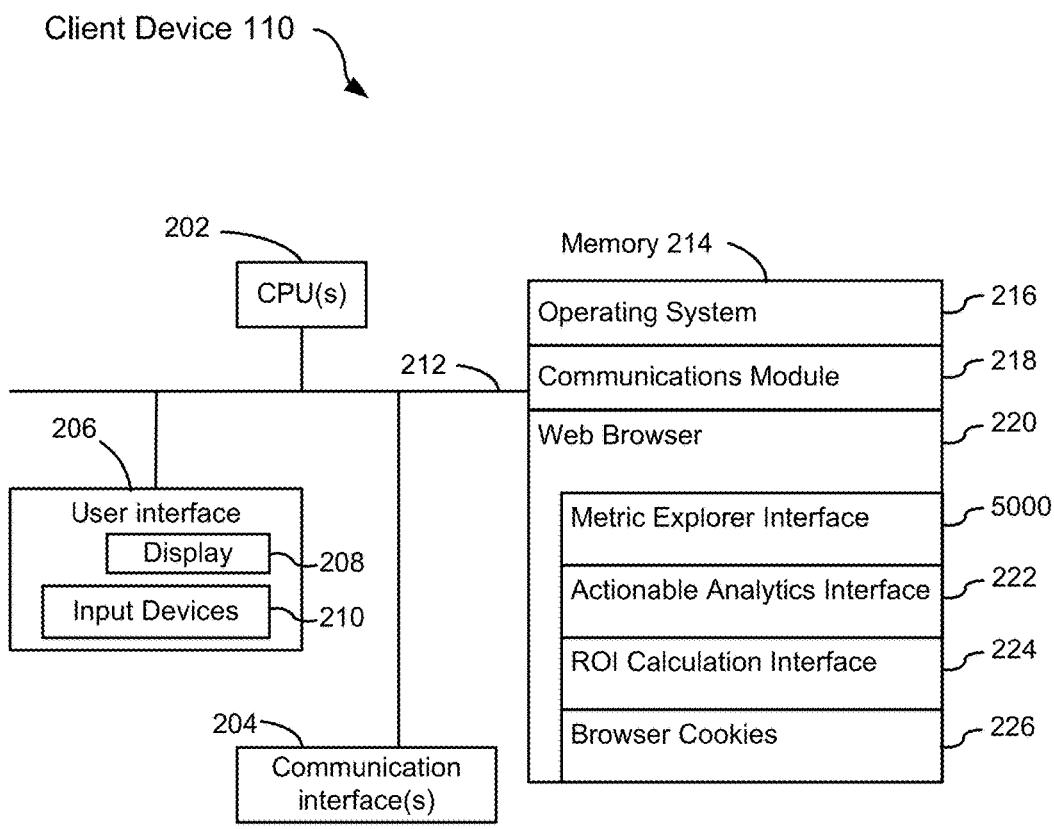
FIG. 2 is a block diagram of a client device in accordance with some implementations.

FIG. 2 illustrates an example of a client device 110. A client device 110 generally includes one or more processing units (CPUs) 202, one or more network or other communications interfaces 204, memory 214, and one or more communication buses 212 for interconnecting these components. The communication buses 212 optionally include circuitry (sometimes called a chipset) that interconnects and controls communications between system components. A client device 110 also includes a user interface 206, for instance a display 208 and a keyboard or other input mechanism 210. Some client devices 110 display a keyboard 210 on the display 208 as needed. Some client devices 110 utilize a touchscreen or touch-sensitive display 208. Memory 214 optionally includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 214 optionally includes mass storage that is remotely located from the central processing unit(s) 202. Memory 214, or alternately the non-volatile memory device(s) within memory 214, comprises a computer readable storage medium. In some implementations, memory 214 or the computer readable storage medium of memory 214 stores the following programs, modules and data structures, or a subset thereof:

- an operating system 216 (e.g., Windows, Mac OS X, iOS, Android, or Linux) that generally includes procedures for handling various basic system services and for performing hardware dependent tasks;
- a network communications module 218 that is used for connecting the client device 110 to servers or other computing devices via one or more communication networks, such as the Internet, other wide area networks, local area networks, metropolitan area networks, and the like;
- a web browser 220 (e.g., Internet Explorer, Safari, Chrome) that is used to access web pages, web applications, and other resources over a communication network, such as the Internet, other wide area networks, local area networks, metropolitan area networks, and the like;
- a metric explorer interface 5000, enabling a user to graphically view data from user interaction with an online community or other social media, and to select many different aspects (or dimensions) of what data is viewed, and how the data is viewed. The metric explorer interface is described in more detail with reference to FIGS. 9-005 to 9-141 of U.S. Provisional Patent Application No. 61/734,927, filed Dec. 7, 2012, entitled "Systems and Methods for Presenting Analytic Data";
- an actionable analytics interface 222, enabling a user to graphically review calculated analytic data based on users' interactions with an online community or other social media. The actionable analytics interface 222 is described in more detail with reference to FIGS. 5A-5S below and FIGS. 9-142 to 9-206 of U.S. Provisional Patent Application No. 61/734,927, filed Dec. 7, 2012, entitled "Systems and Methods for Presenting Analytic Data";
- a return on investment (ROI) calculation interface 224, enabling a user to compute the return on investment for an online community 100, or compute correlations between business key performance indicators (KPIs) and various metrics. The ROI calculation interface 224 is described in greater detail with reference to FIGS. 5T-5II below and FIGS. 9-207 to 9-236 of U.S. Provisional Patent Application No. 61/734,927, filed Dec. 7, 2012, entitled "Systems and Methods for Presenting Analytic Data"; and
- one or more browser cookies 226, which save state or other information for a web page or web application.

Figure 3:
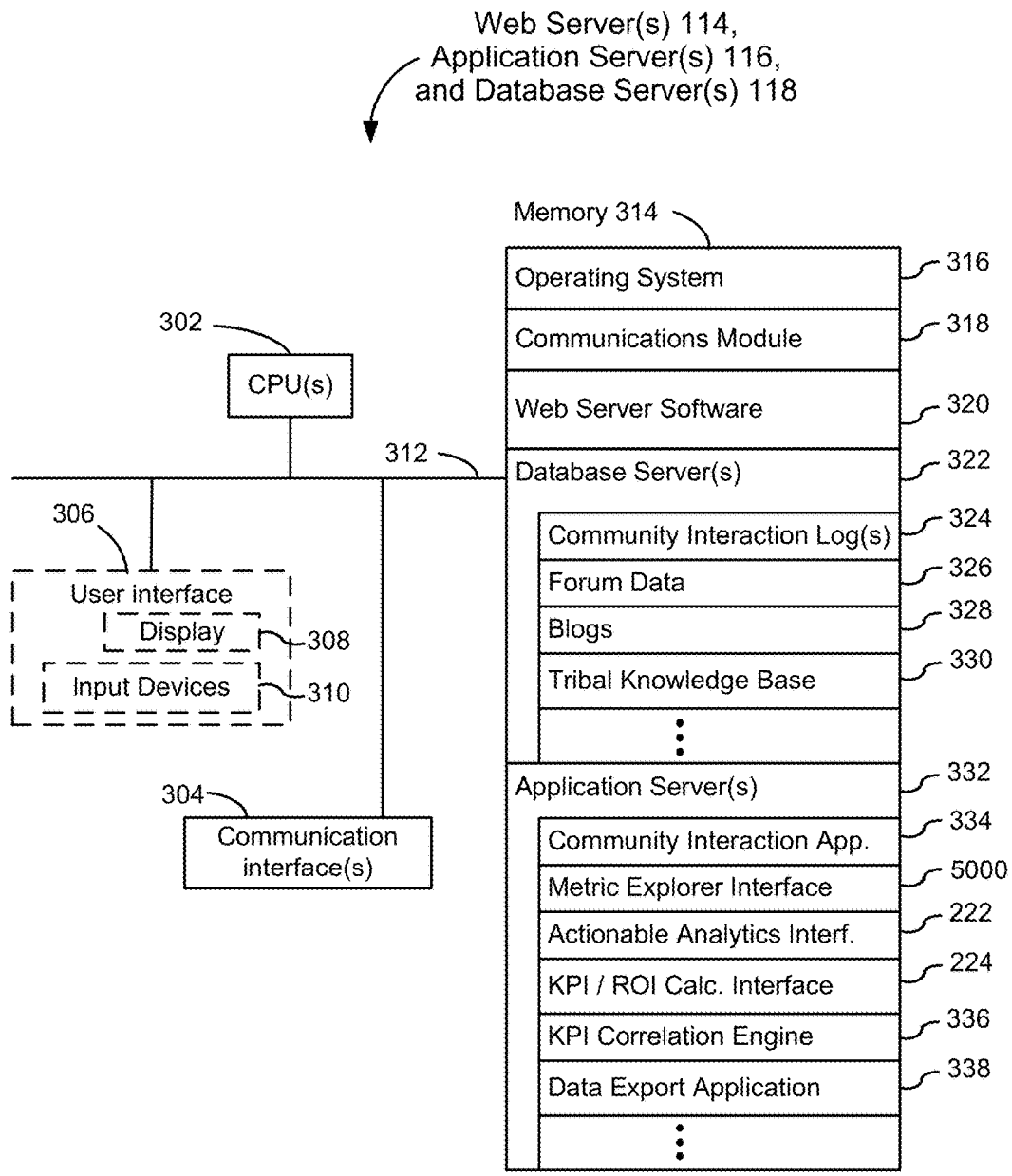
FIG. 3 is a block diagram illustrating the structure of web servers, database servers, and application servers in accordance with some implementations.

FIG. 3 illustrates an example of a server, such as a web server 114, an application server 116, or a database server 118. A server 114/116/118 generally includes one or more processing units (CPUs) 302, one or more network or other communications interfaces 304, memory 314, and one or more communication buses 312 for interconnecting these components. The communication buses 312 optionally include circuitry (sometimes called a chipset) that interconnects and controls communications between system components. The server 114/116/118 optionally includes a user interface 306, for instance, a display 308 and a keyboard or other input device 310. Memory 314 optionally includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 314 optionally includes mass storage that is remotely located from the central processing unit(s) 302. Memory 314, or alternately the non-volatile memory device(s) within memory 314, comprises a computer readable storage medium. In some implementations, memory 314 or the computer readable storage medium of memory 314 stores the following programs, modules and data structures, or a subset thereof:

- an operating system 316 (e.g., Linux or Unix) that generally includes procedures for handling various basic system services and for performing hardware dependent tasks;
- a network communications module 318 that is used for connecting the server 114/116/118 to other servers or other computing devices via one or more communication networks, such as the Internet, other wide area networks, local area networks, metropolitan area networks, and the like;
- web server software 320 (e.g. Apache web server or Apache Tomcat) that receives web requests, and delivers appropriate web pages or other resources in response to the requests;
- database server software 322 (e.g., MySQL or other structured query language (SQL) database engine), which stores organized relational data for the online community 100, and provides the data as needed;
- a database 324 that contains one or more community interaction logs. The log database(s) track information about user interactions with the online community. For example, clicking to view a web page generates a "page view" event, which is logged. The log record for this event optionally includes the user name or ID, the time of the page view, which page was viewed, etc.;
- a forum database 326, which includes data for one or more community forums. This includes all data and metadata for posts to each forum, as well as configuration information about each forum;
- a blog database 328, which stores blogs for one or more individuals, including all of the content of the blog, as well as comments, etc.;
- a tribal knowledge base database 330, which is an organized collection of articles that have generally proceeded through a review process, providing useful information on a topic (e.g., how to utilize a feature of a product provided by the business entity);
- an application server 332, which provides the functionality of the online community 100 and functionality to access the interaction data 324 generated by users 102 of the online community 100;
- one or more community interaction applications or interfaces 334, which are used by users 102 who participate in the online community 100;
- a metric explorer interface 5000, which is used by users (e.g., Managers) to review the raw interaction data. This is described in more detail with reference to FIGS. 9-005 to 9-141 of U.S. Provisional Patent Application No. 61/734,927, filed Dec. 7, 2012, entitled "Systems and Methods for Presenting Analytic Data";
- an actionable analytics interface 222, which is used by users (e.g., Stakeholders) to review computed analytic data based on the interactions of users 102 with the online community 100. The actionable analytics interface is described in more detail with reference to FIGS. 5A-5S below and FIGS. 9-142 to 9-206 of U.S. Provisional Patent Application No. 61/734,927, filed Dec. 7, 2012, entitled "Systems and Methods for Presenting Analytic Data";
- a KPI/ROI calculation interface 224, which is used by users (e.g., Executives) to evaluate the return on investment for an online community. In some implementations, the interface 224 computes correlations between business key performance indicators and community metrics. This is described in greater detail with reference to FIGS. 5T-5II below and FIGS. 9-207 to 9-236 of U.S. Provisional Patent Application No. 61/734,927, filed Dec. 7, 2012, entitled "Systems and Methods for Presenting Analytic Data";
- a KPI calculation engine 336, which computes correlation coefficients between sets of data;
- a data export application 338, which converts retrieved data into various external file formats, including CSV (comma separated values), PDF (portable document format), PNG (portable network graphics), and XLS (Microsoft Excel).

Although FIG. 3 shows examples of servers, it is intended more as functional description of the various features which are, in some circumstances, present in a set of servers than as a structural schematic of the implementations described herein. In practice, and as recognized by those of ordinary skill in the art, items shown separately could be combined and some items could be separated. For example, some items shown separately in FIGS. 1 and 3 could be implemented on single servers and single items could be implemented by one or more servers. The actual number of servers used to implement the web servers, application servers, and database servers, and how features are allocated among them will vary from one implementation to another, and optionally depends in part on the amount of data traffic that the system must handle during peak usage periods as well as during average usage periods.

Each of the methods described herein are, optionally, performed by instructions that are stored in a computer readable storage medium and that are executed by one or more processors of one or more servers or clients. Each of the operations shown in FIGS. 4A-4B optionally correspond to instructions stored in a computer memory or computer readable storage medium.

Methods for Displaying Data

Figure 4A:
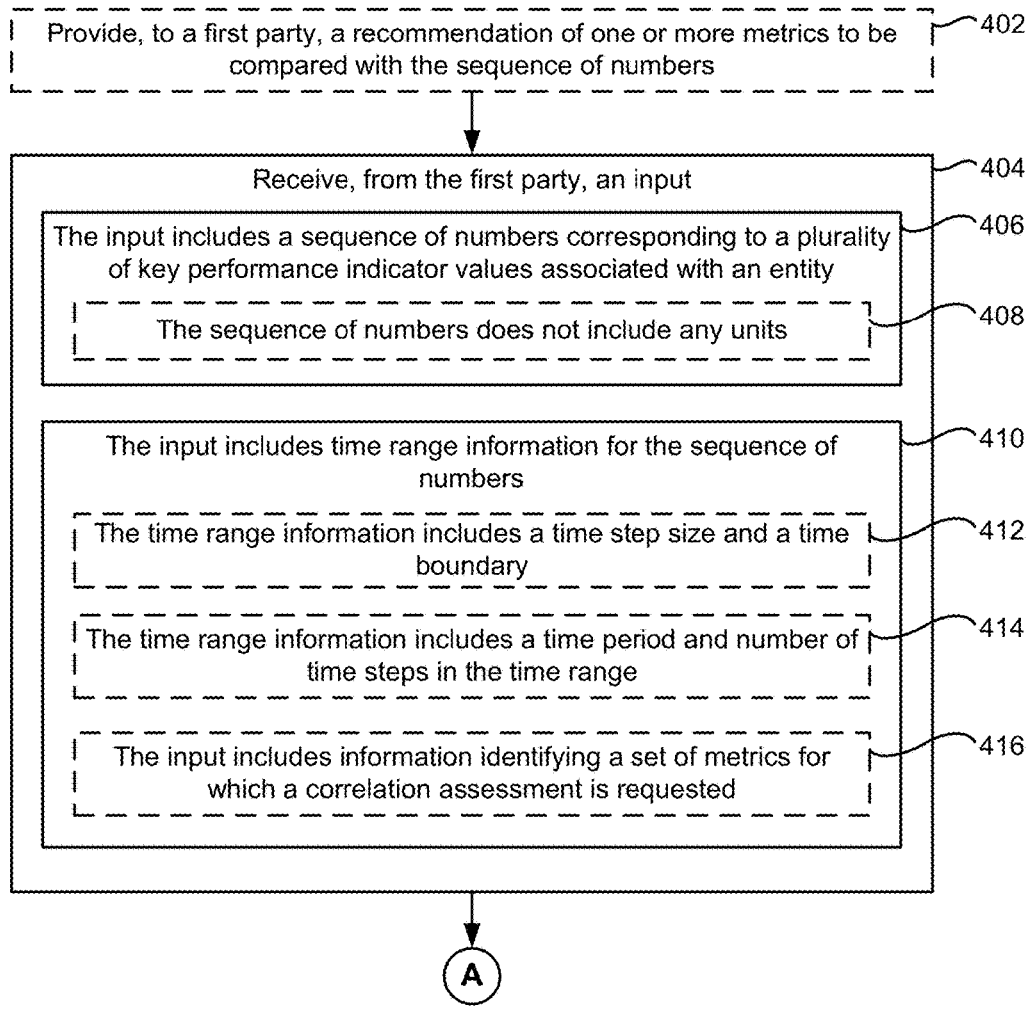
FIGS. 4A-4B are flow diagrams illustrating a method of determining a correlation between data corresponding to key performance indicators and data corresponding to metrics in accordance with some implementations.
Figure 4B:
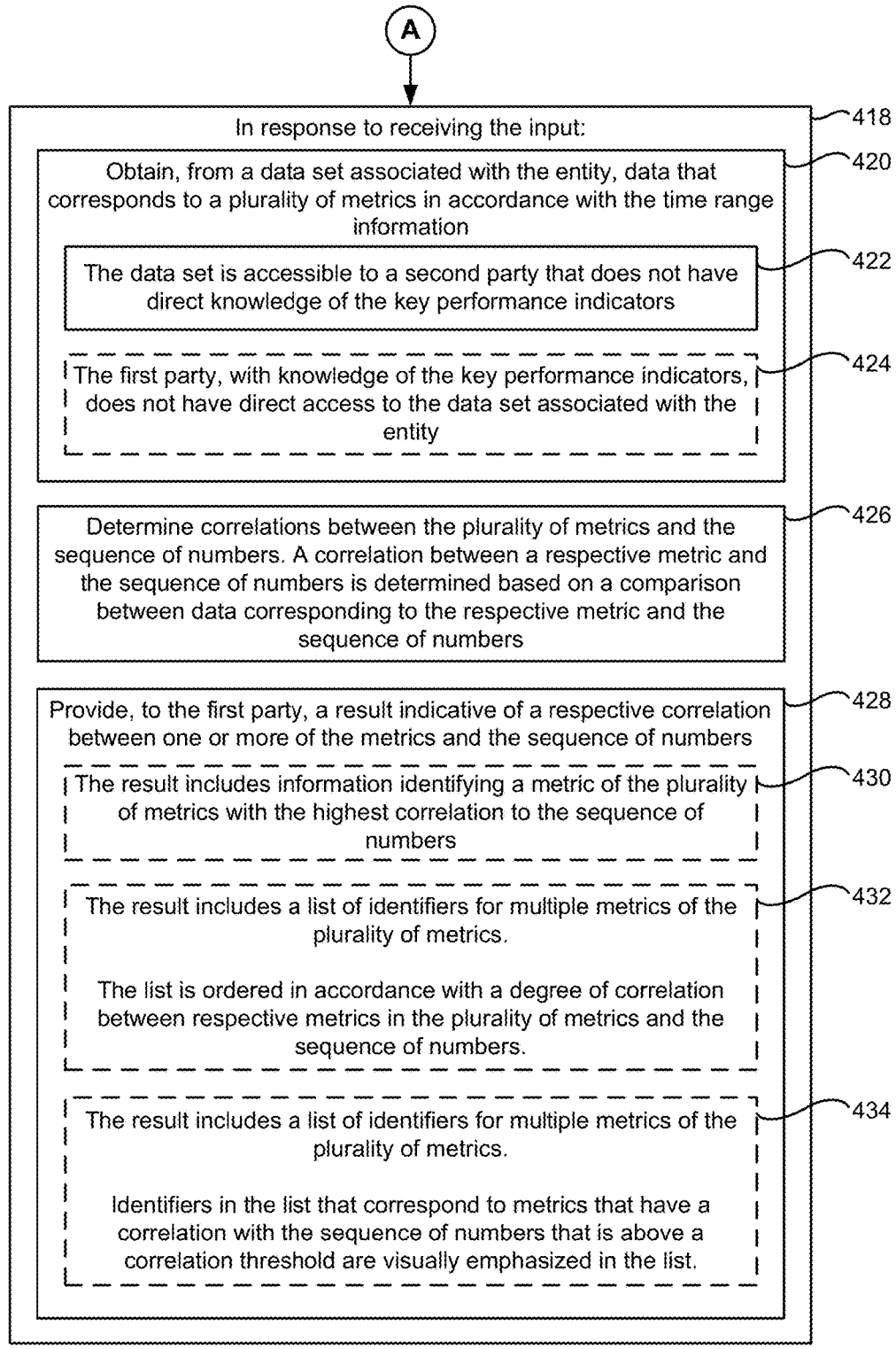

FIGS. 4A-4B are flow diagrams illustrating a method 400 of determining a correlation between data corresponding to key performance indicators and data corresponding to metrics in accordance with some implementations. The method 400 is performed at a computing device (e.g., Client Device 110 in FIG. 2, Web Server 114 in FIG. 3, Application Server 116 in FIG. 3, or Database Server 118 in FIG. 3) with a display and an input device (e.g., a mouse, a trackpad, a touch screen or voice control module). Some operations in method 400 are, optionally, combined and/or the order of some operations is, optionally, changed. As described below, the method 400 provides an intuitive way to determine a correlation between data corresponding to key performance indicators and data corresponding to metrics. The method reduces the cognitive burden on a user when determining correlations between data, thereby creating a more efficient human-machine interface. For battery-operated electronic devices, enabling a user to view data faster and more efficiently conserves power and increases the time between battery charges.

In some implementations, the device provides (402), to a first party, a recommendation of one or more metrics to be compared with a sequence of numbers provided by the first party (e.g., based on a preliminary analysis of the sequence of numbers, or historically relevant metrics). After optionally providing the recommendation to the first party, the device receives (404), from the first party, an input (e.g., from the input device). The input includes (406) a sequence of numbers corresponding to a plurality of key performance indicator values associated with an entity (e.g., as shown in FIG. 5T). In some implementations, the sequence of numbers does not include (408) any units (e.g., the device does not have any information about what information is represented by the sequence of numbers).

In some implementations, the input includes (410) time range information for the sequence of numbers (e.g., as shown in FIG. 5T). In some implementations, the time range information includes (412) a time step size and a time boundary (e.g., as shown in FIG. 5T). In some implementations, the time boundary includes a start time and/or an end time of the time range. In some implementations, the time range information includes (414) a time period and number of time steps in the time range. In some implementations, the number of time steps in the time range is explicitly specified. In some implementations the number of time steps in the time range is implicitly specified (e.g., if the user provides 6 numbers corresponding to key performance indicators, the device determines that the time range includes 6 evenly spaced time steps). In some implementations, the input includes (416) information identifying a set of metrics for which a correlation assessment is requested (e.g., as shown in FIG. 5GG). In some implementations, a user identifies metrics to be compared with the key performance indicators.

Figure 5A:
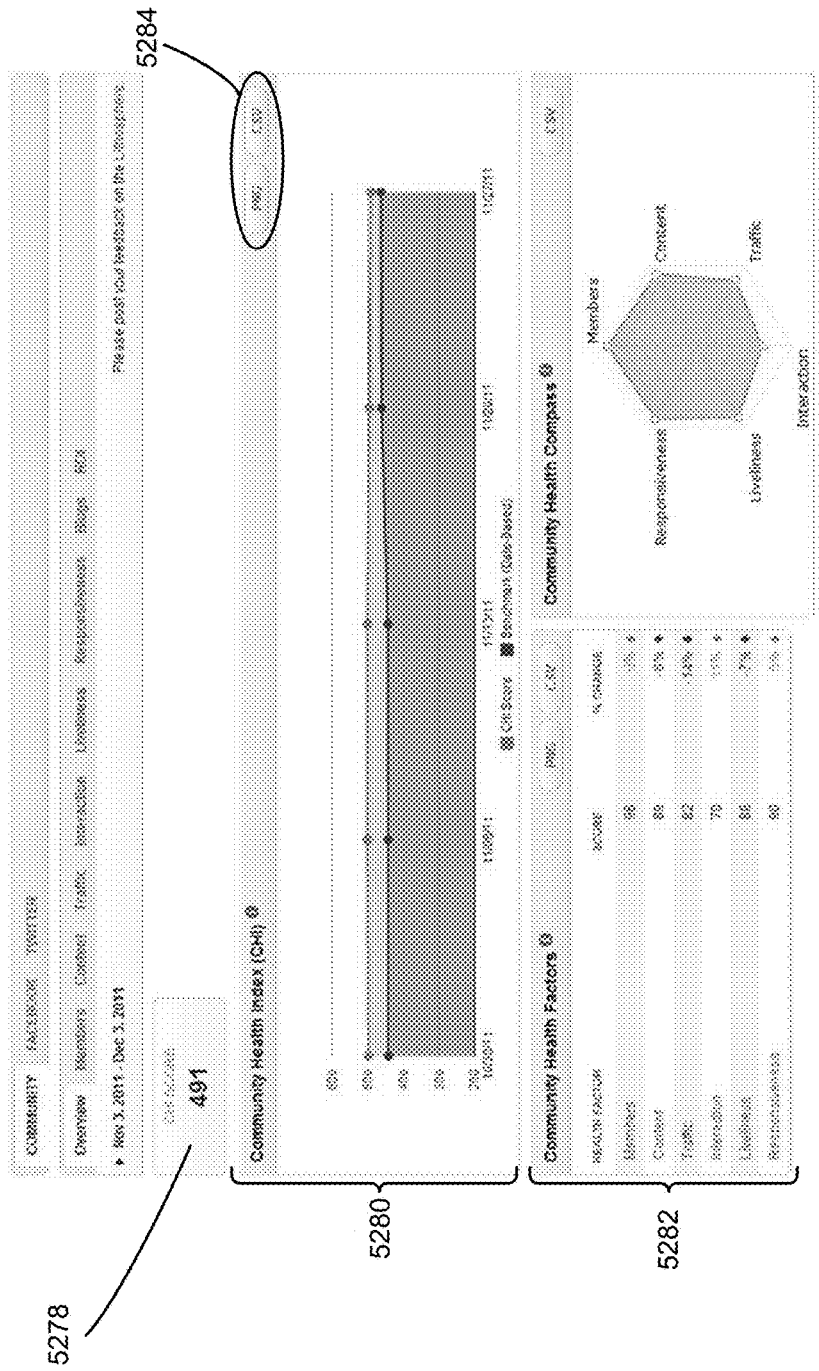
FIGS. 5A-5S illustrate methods of presenting, selecting, and changing views of actionable analytic data in accordance with some implementations.
Figure 5B:
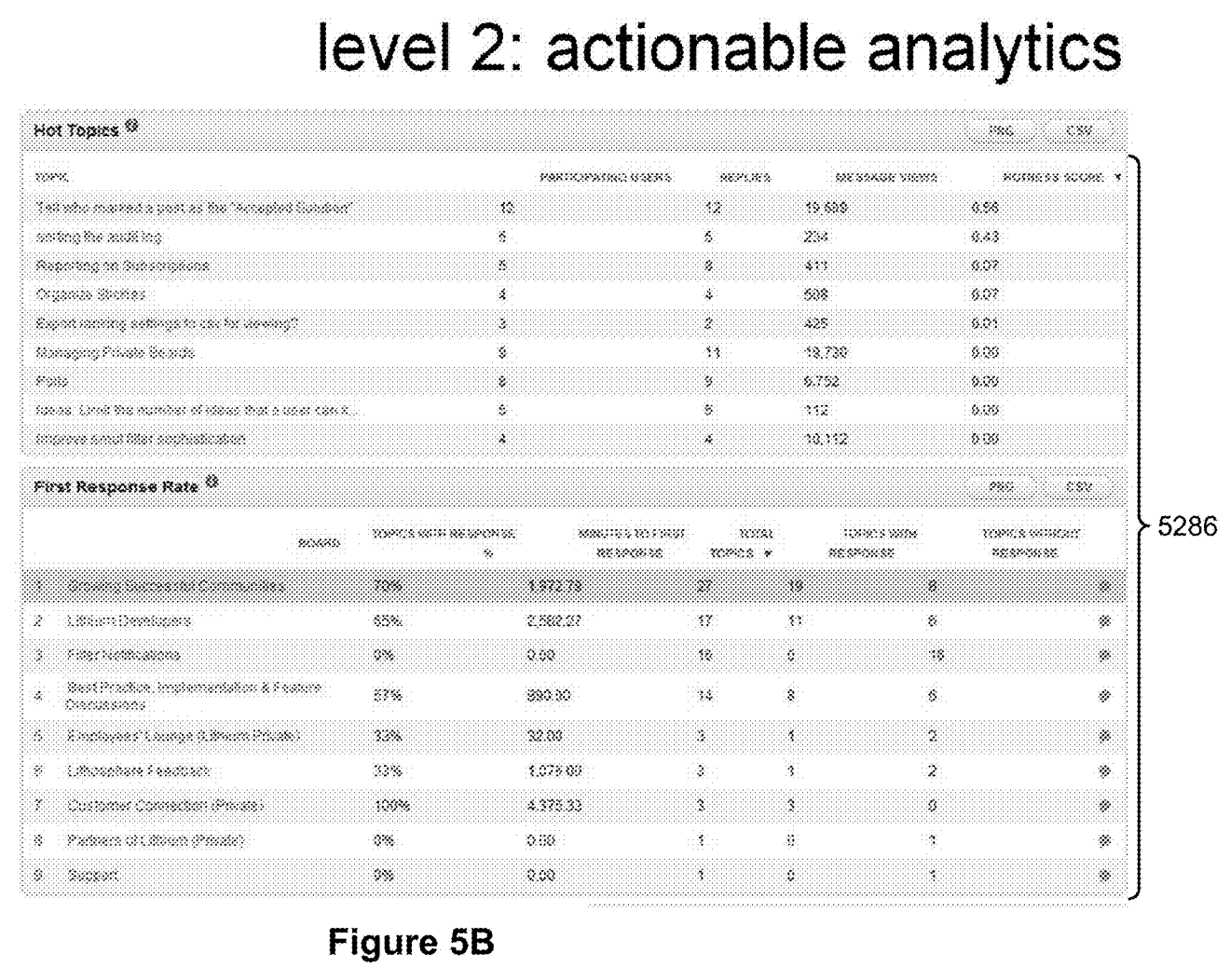
Figure 5C:
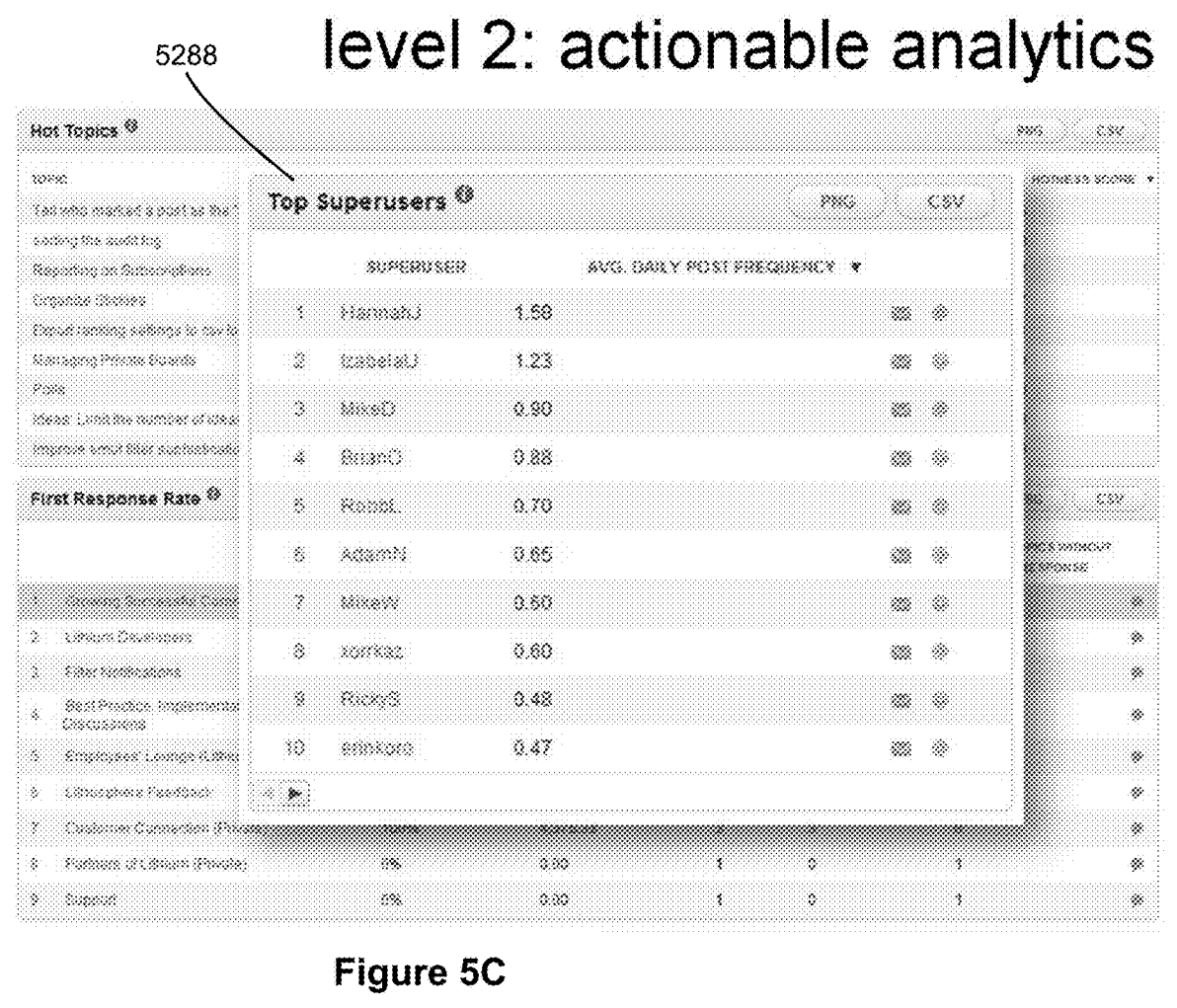
Figure 5D:
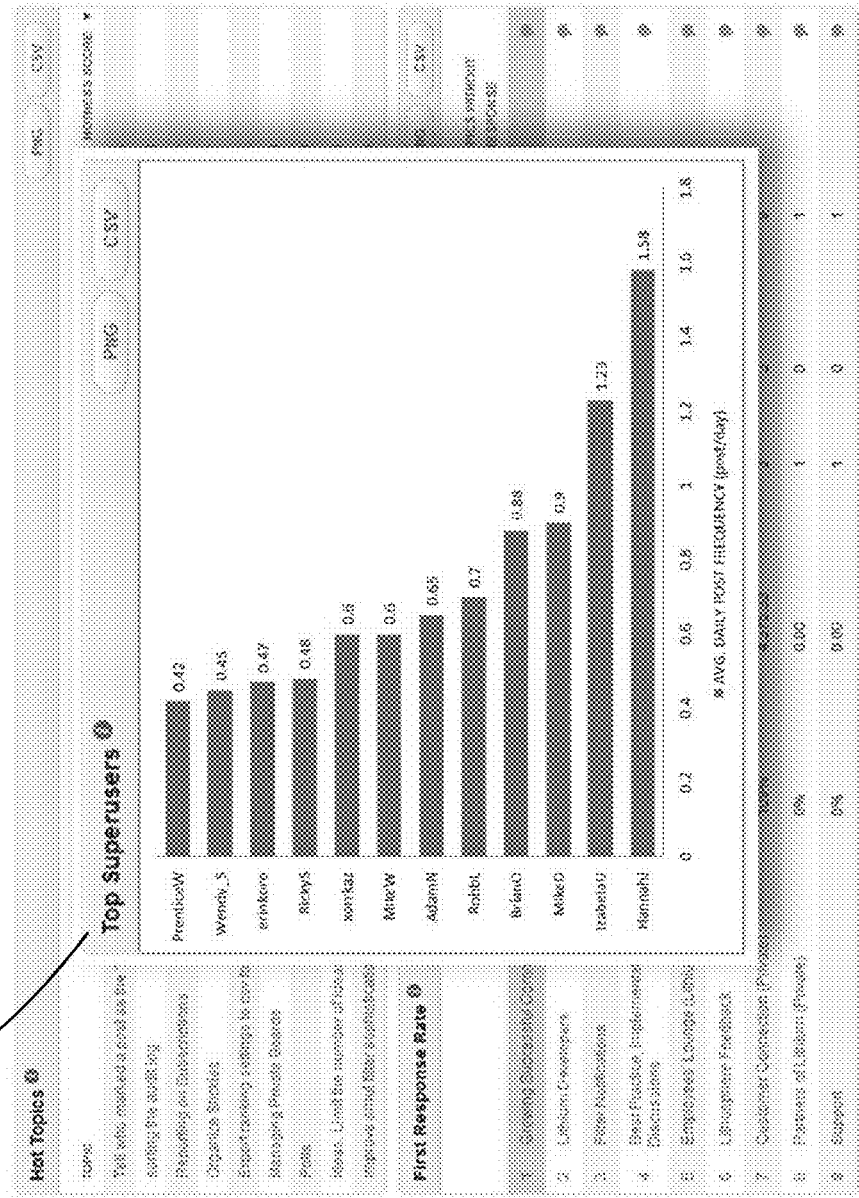
FIGS. 5T-5II illustrate methods of selecting and correlating business key performance indicators with other quantified metrics in accordance with some implementations.
Figure 5E:
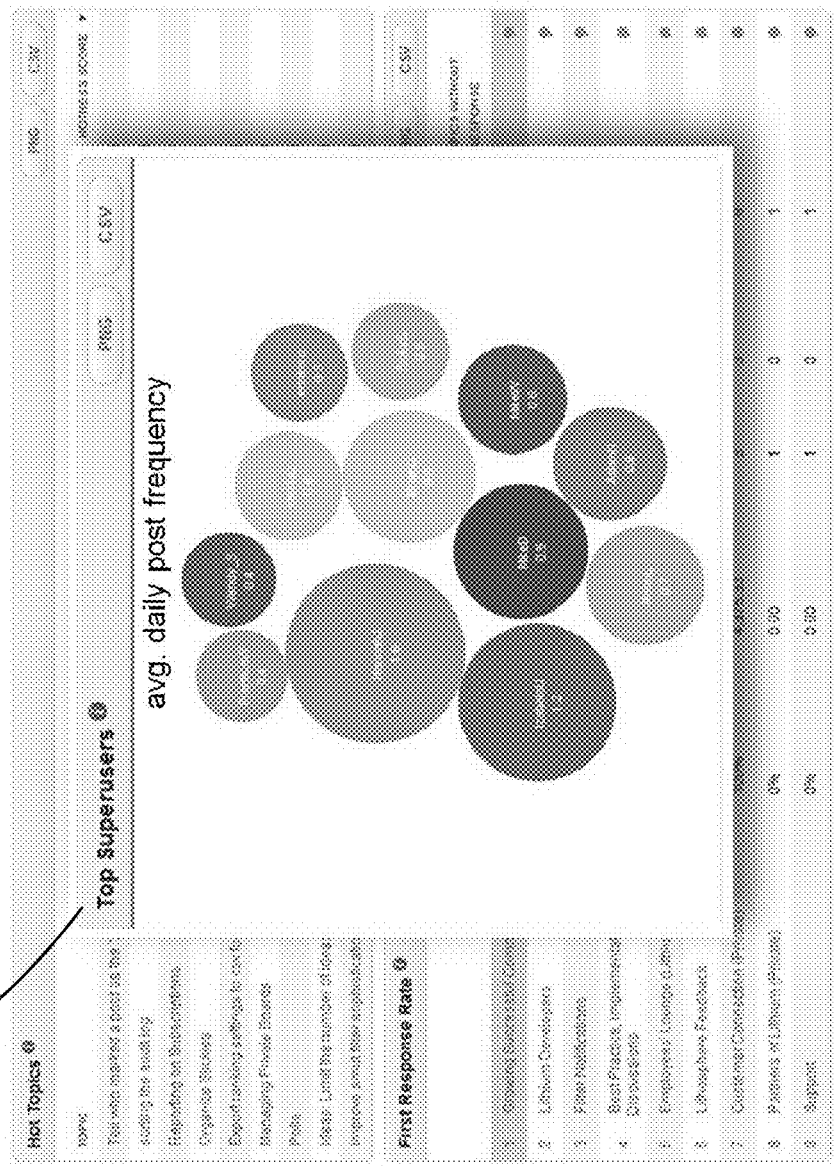
Figure 5F:
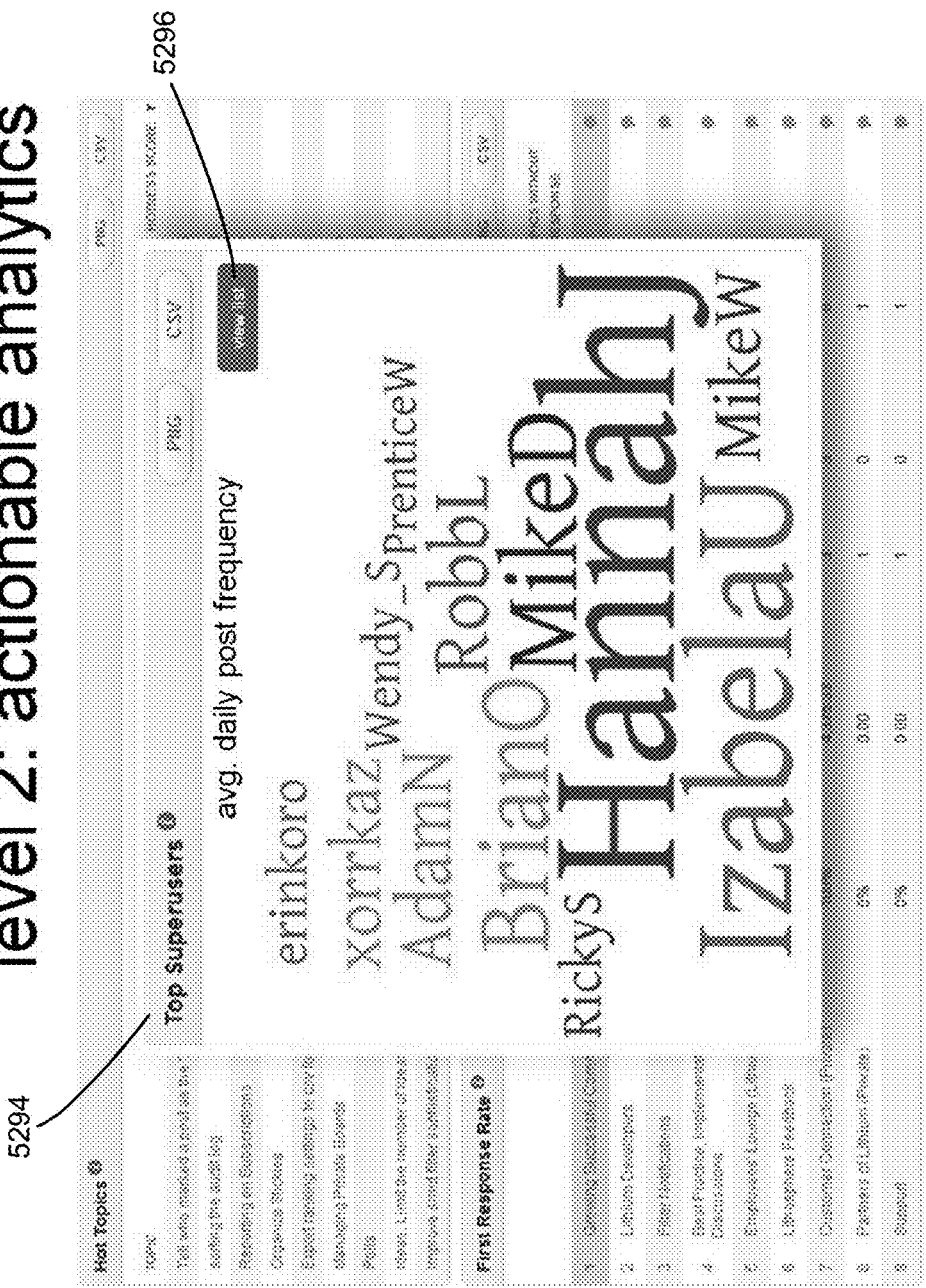
Figure 5G:
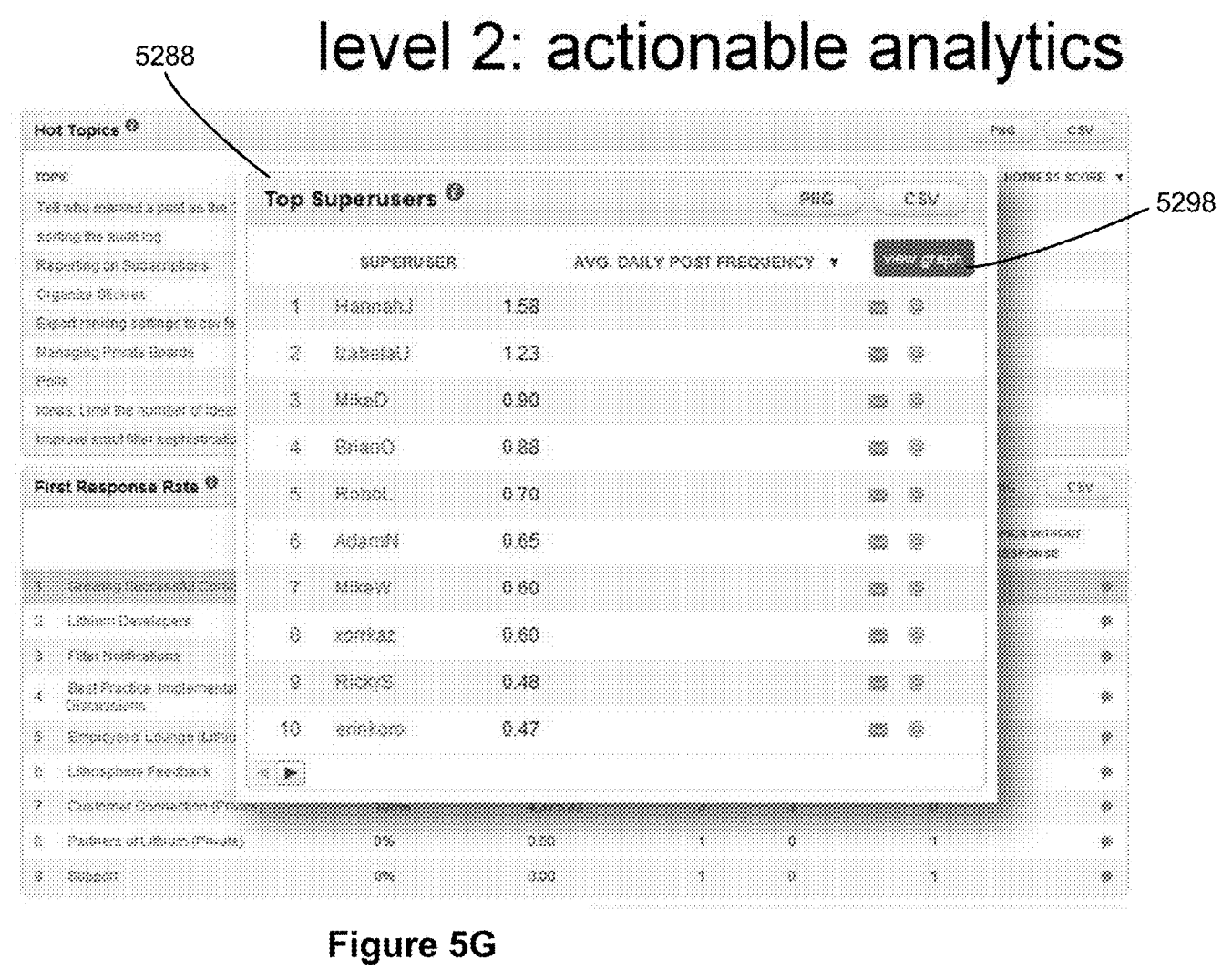
Figure 5H:
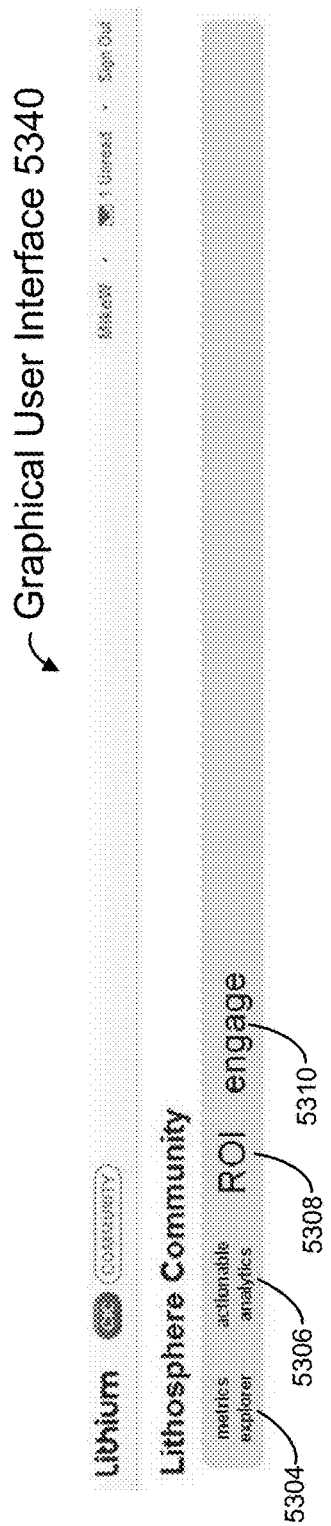
Figure 5I:
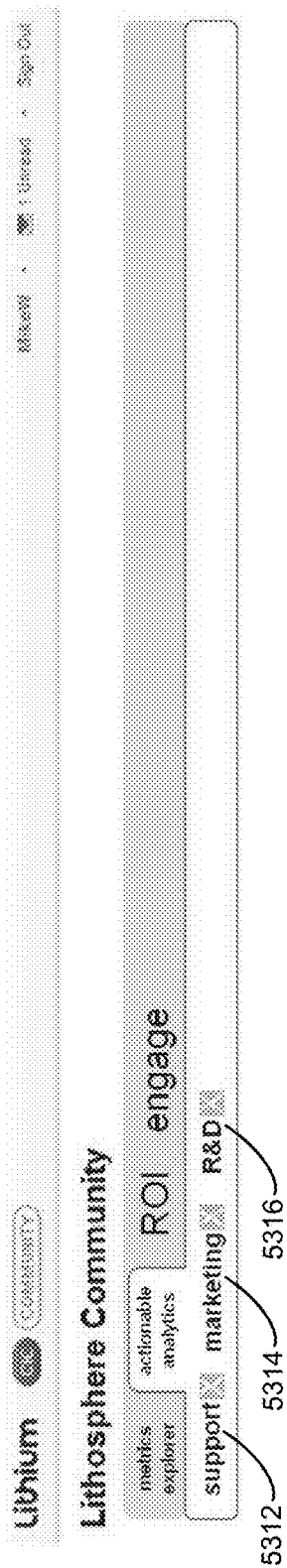
Figure 5J:
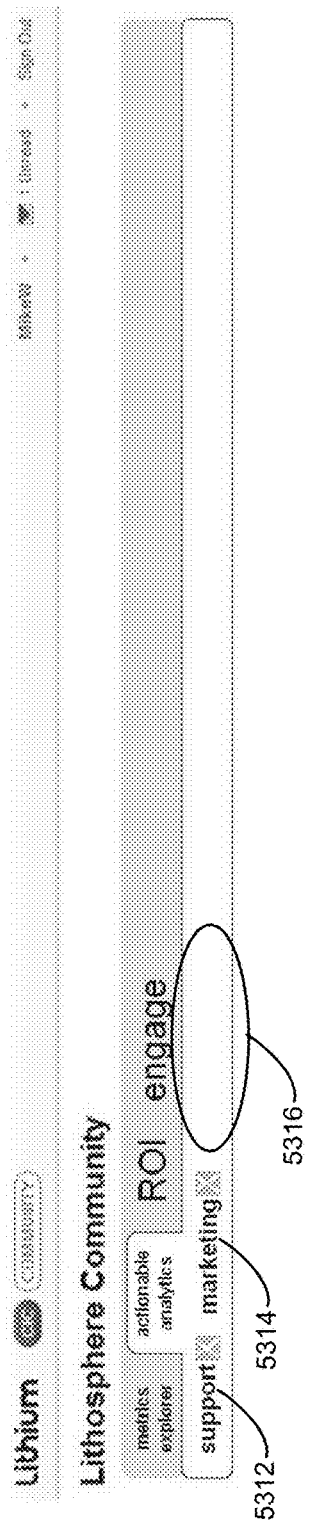
Figure 5K:
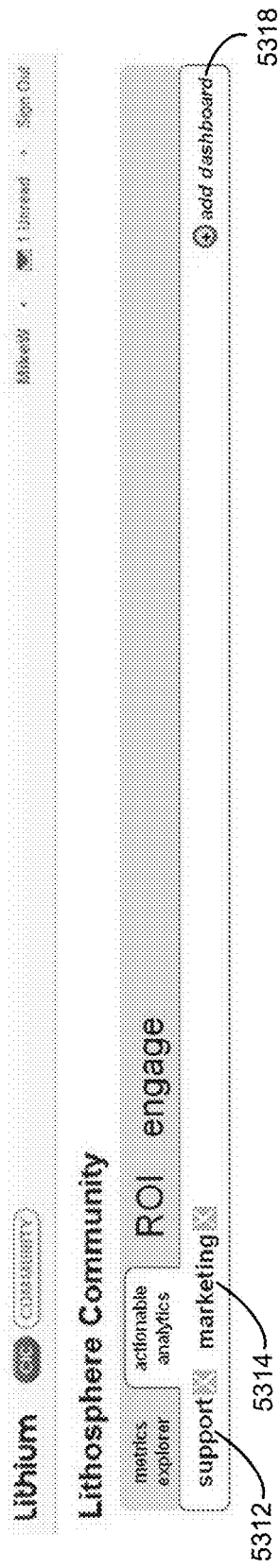
Figure 5L:
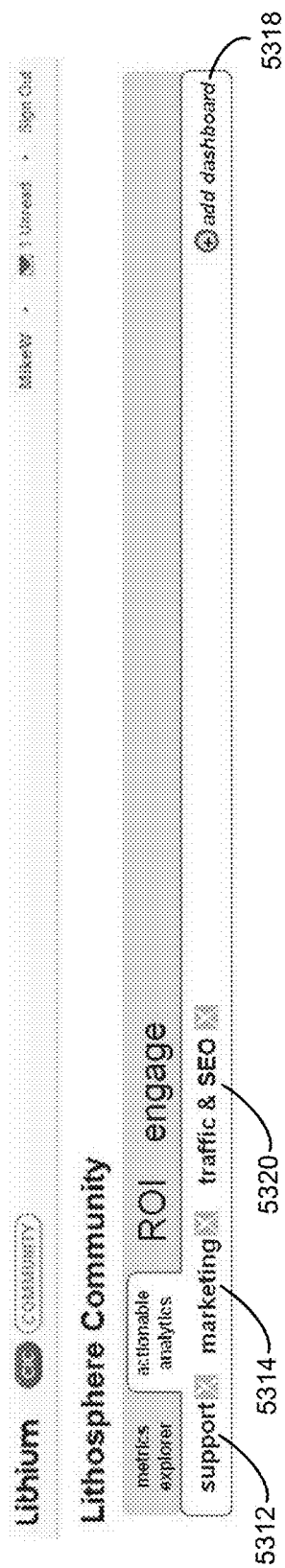
Figure 5M:
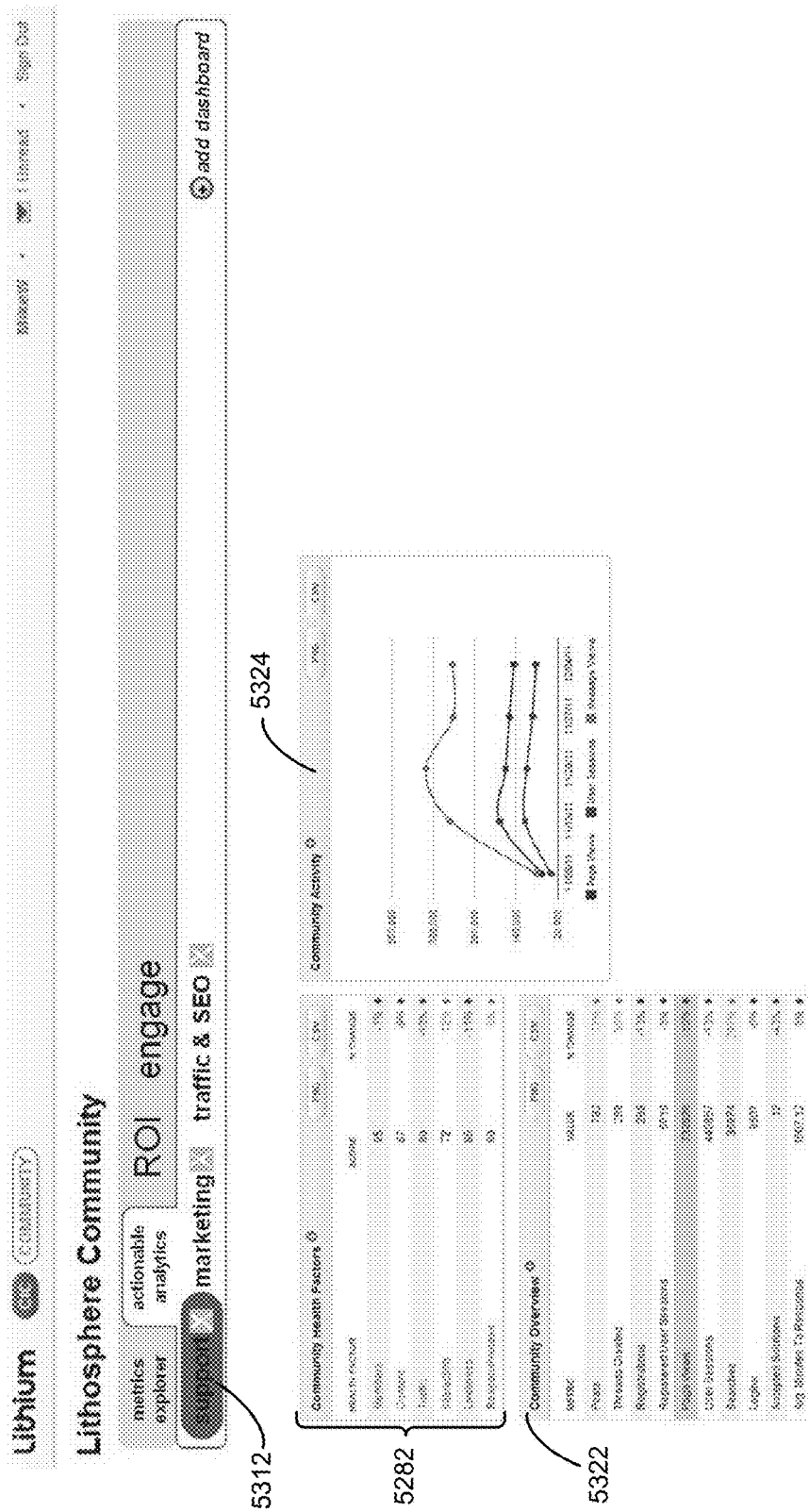
Figure 5N:
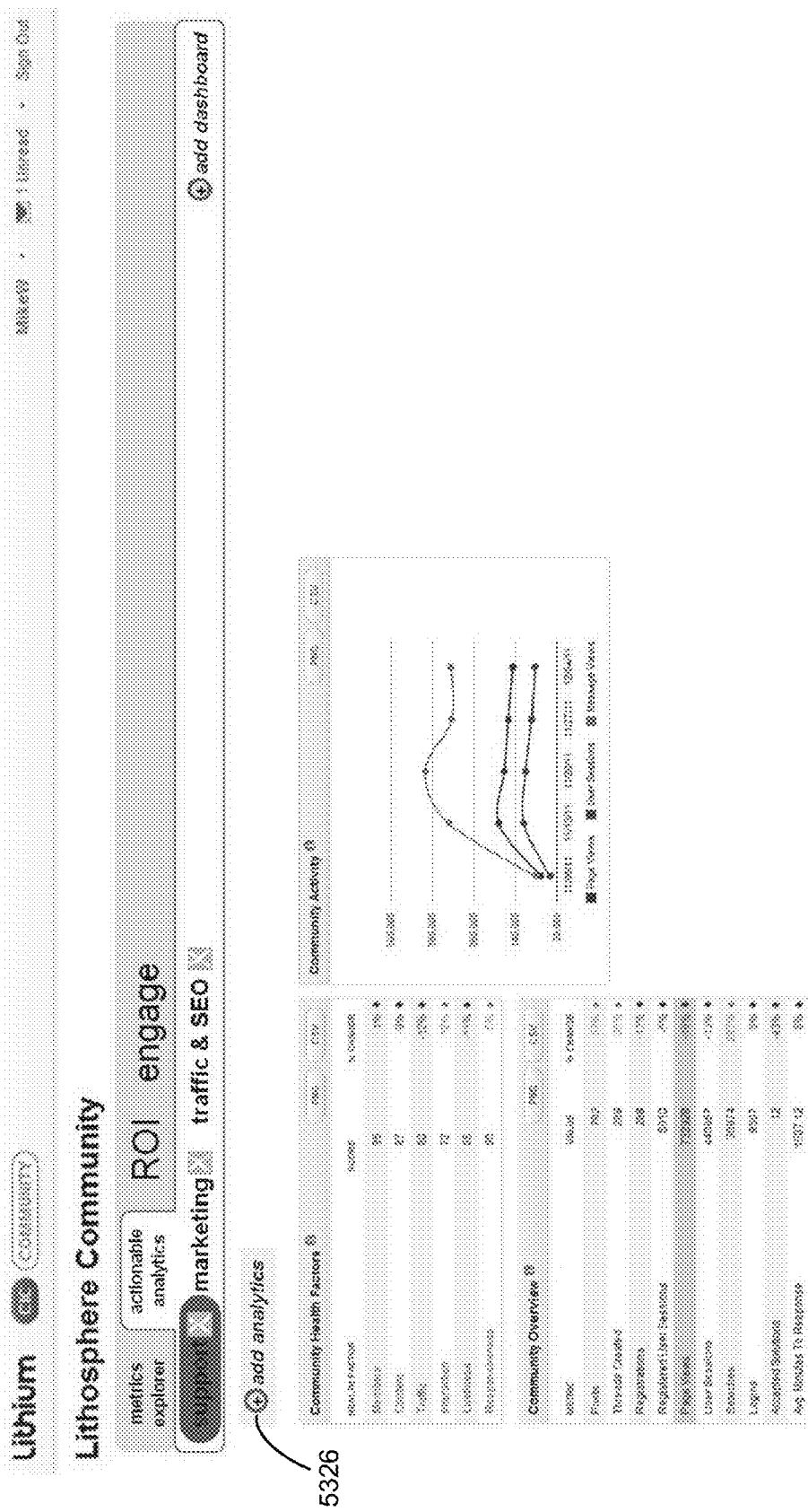
Figure 5O:
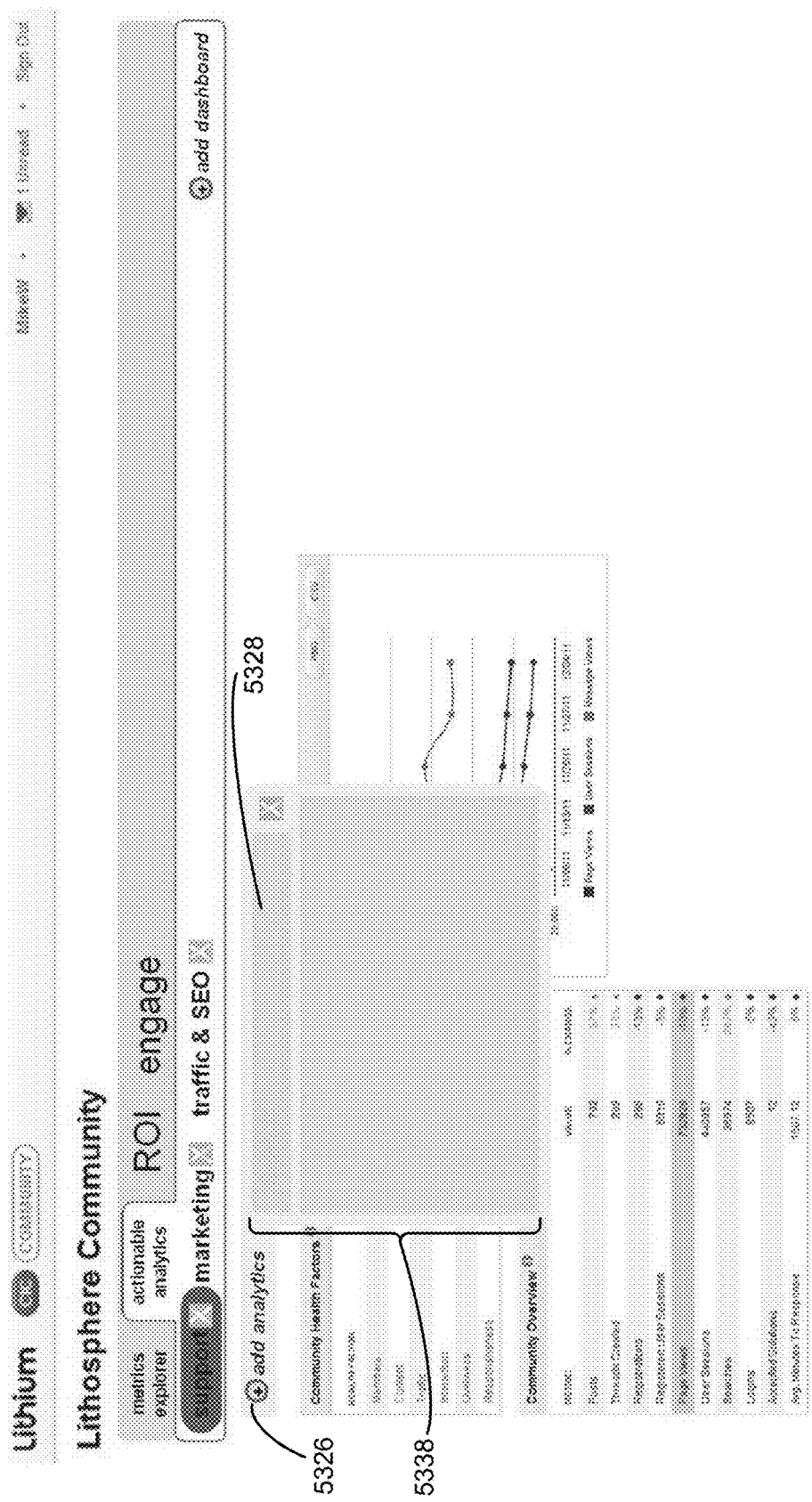
Figure 5P:
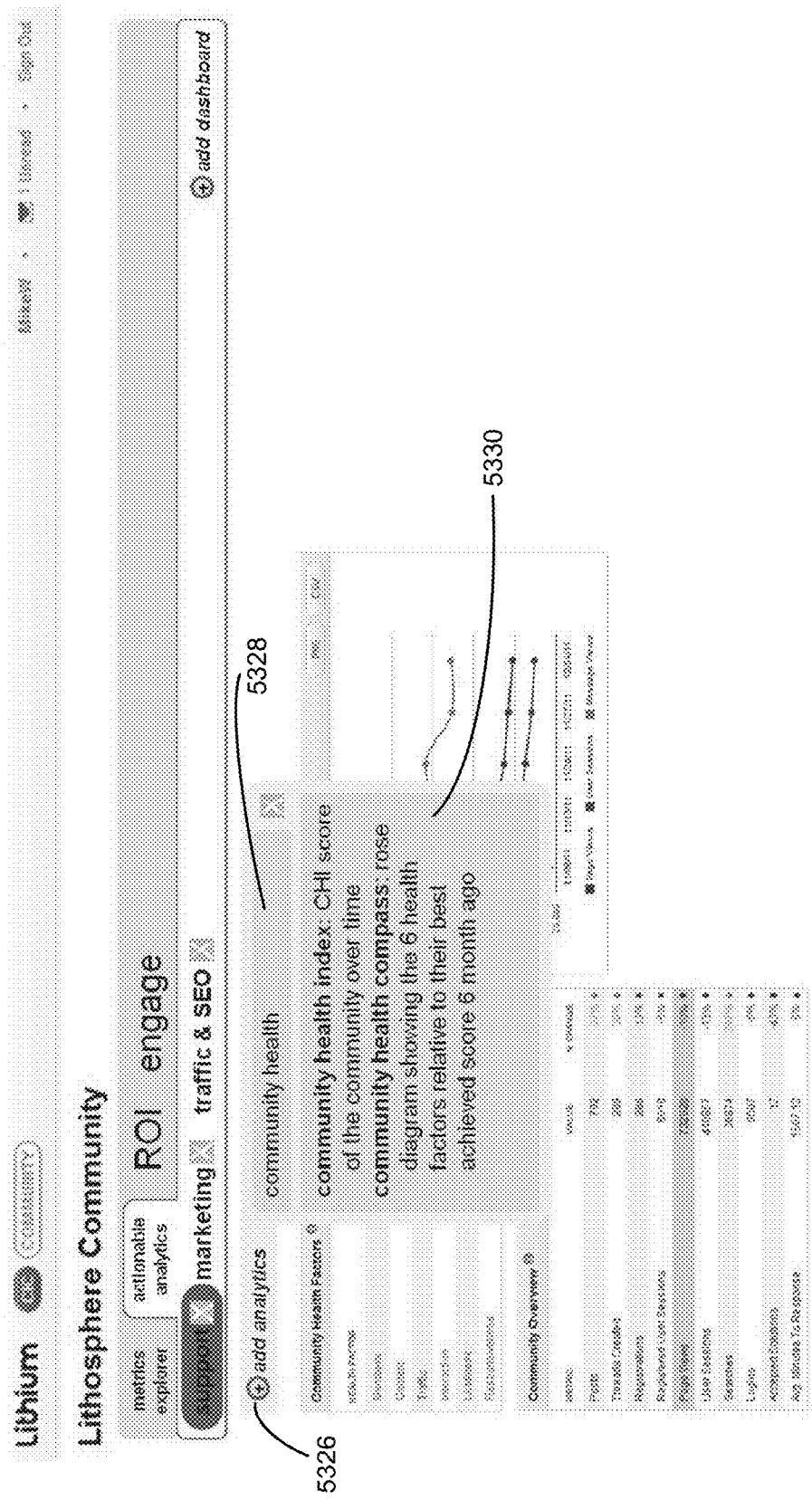
Figure 5Q:
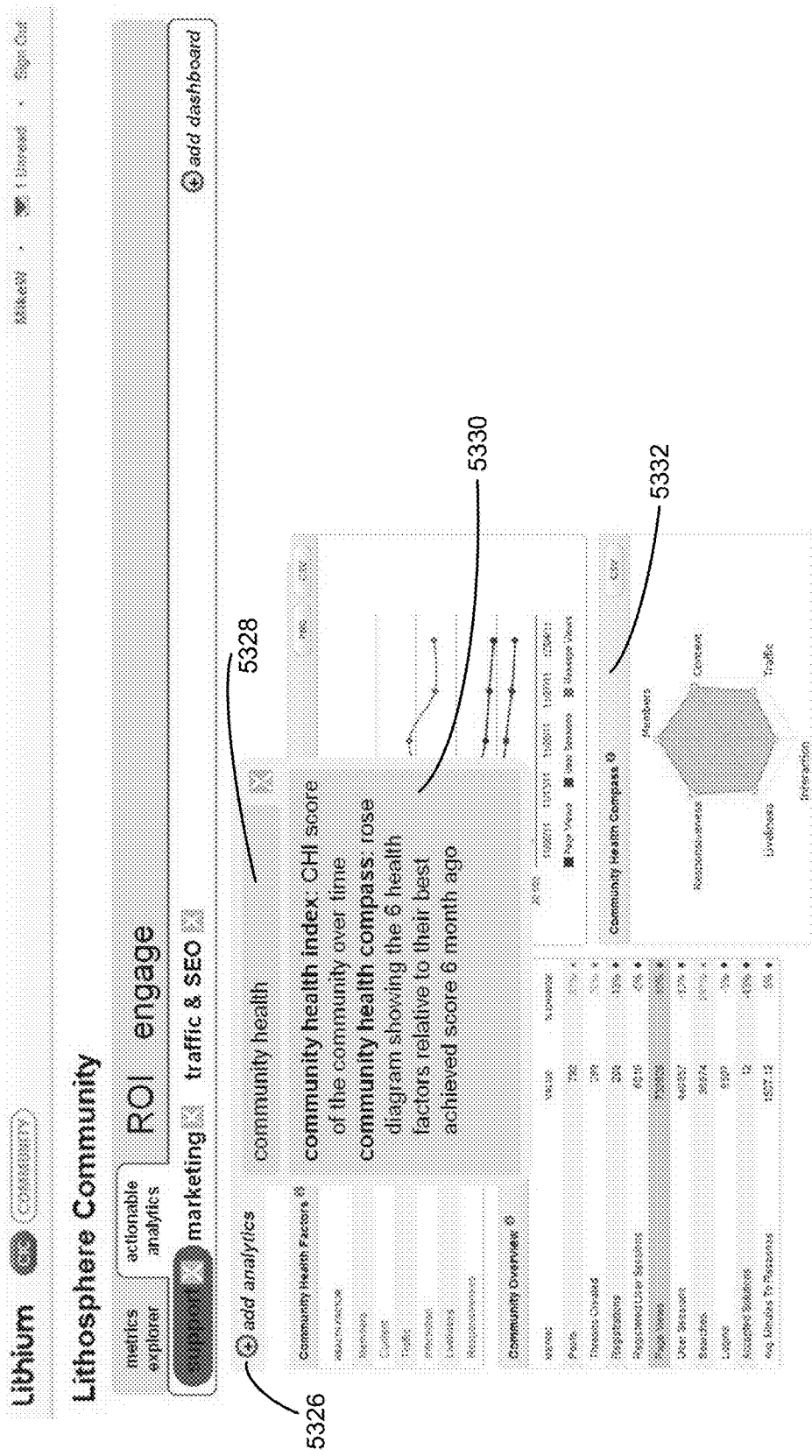
Figure 5R:
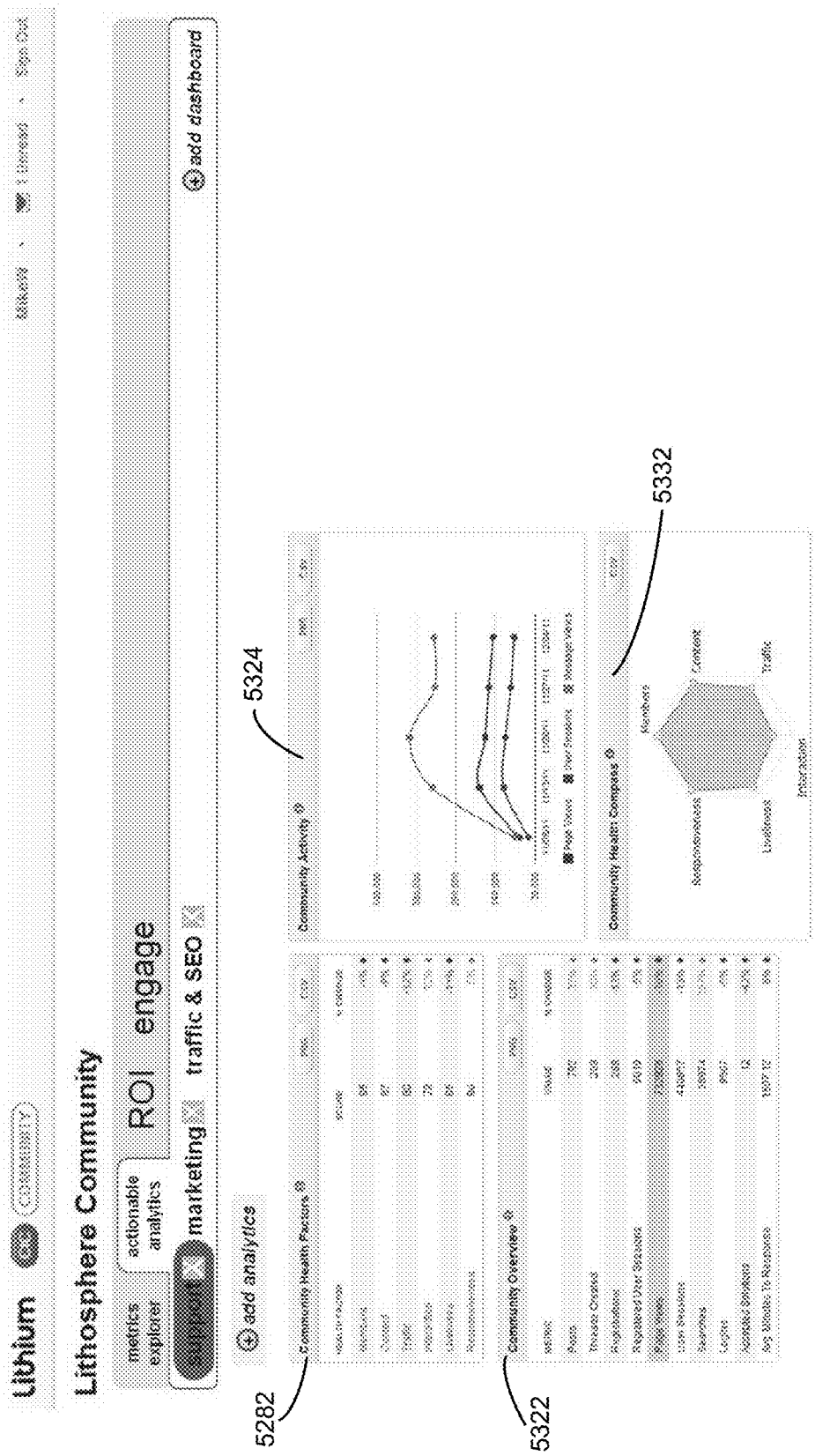
Figure 5S:
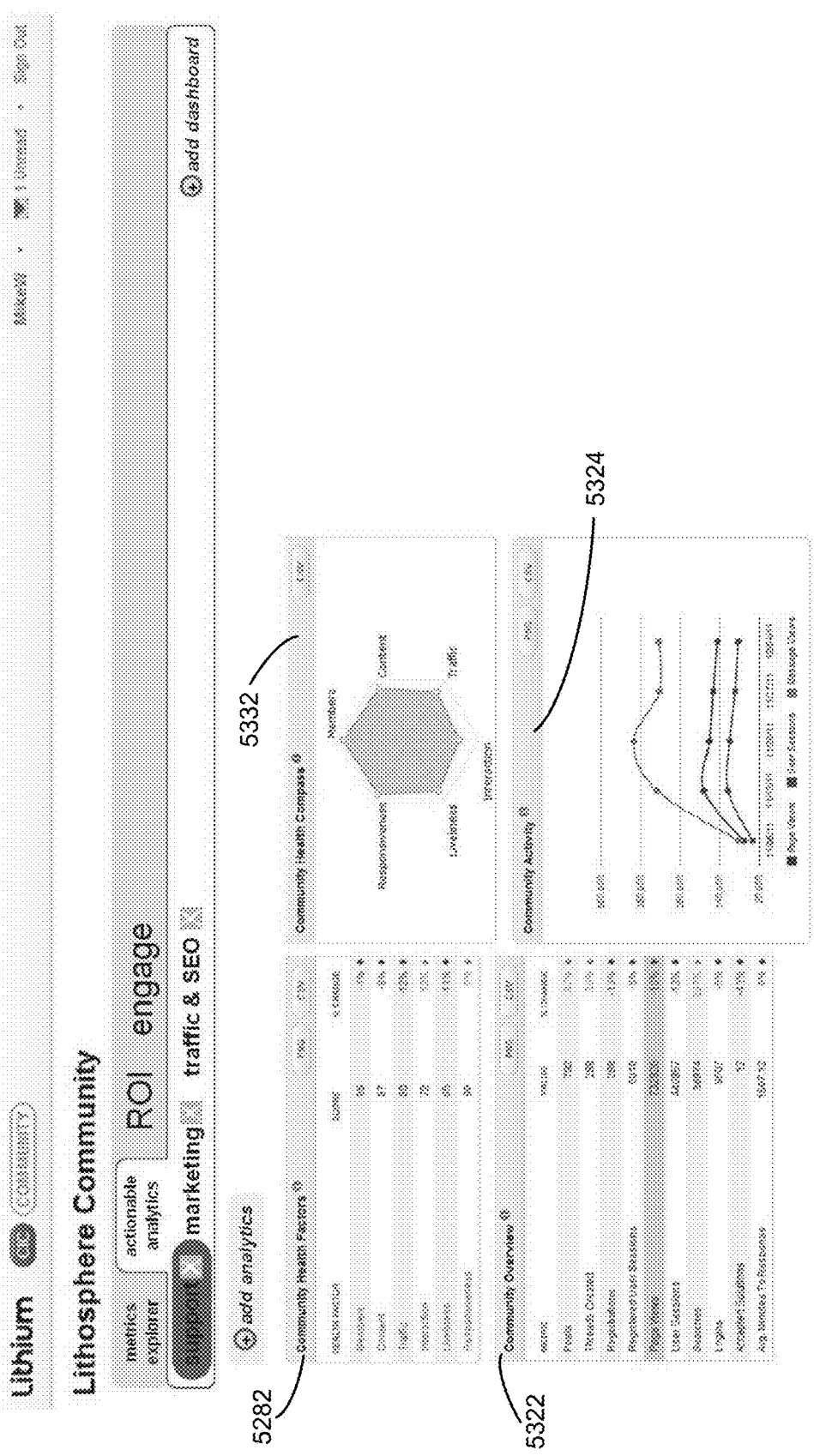
Figure 5V:
Figure 5W:
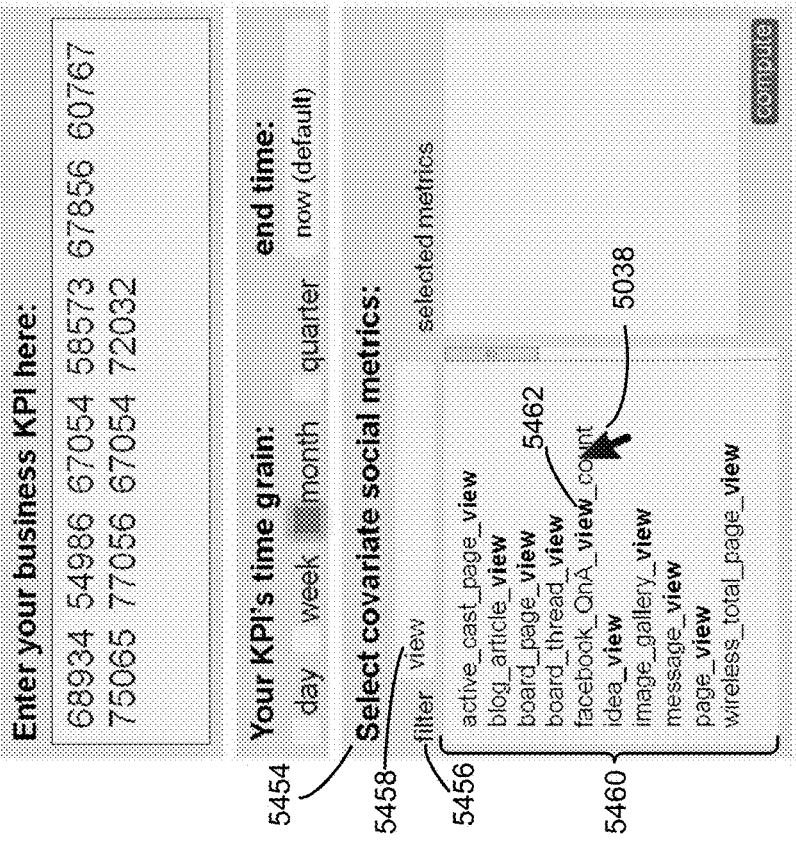
Figure 5H:
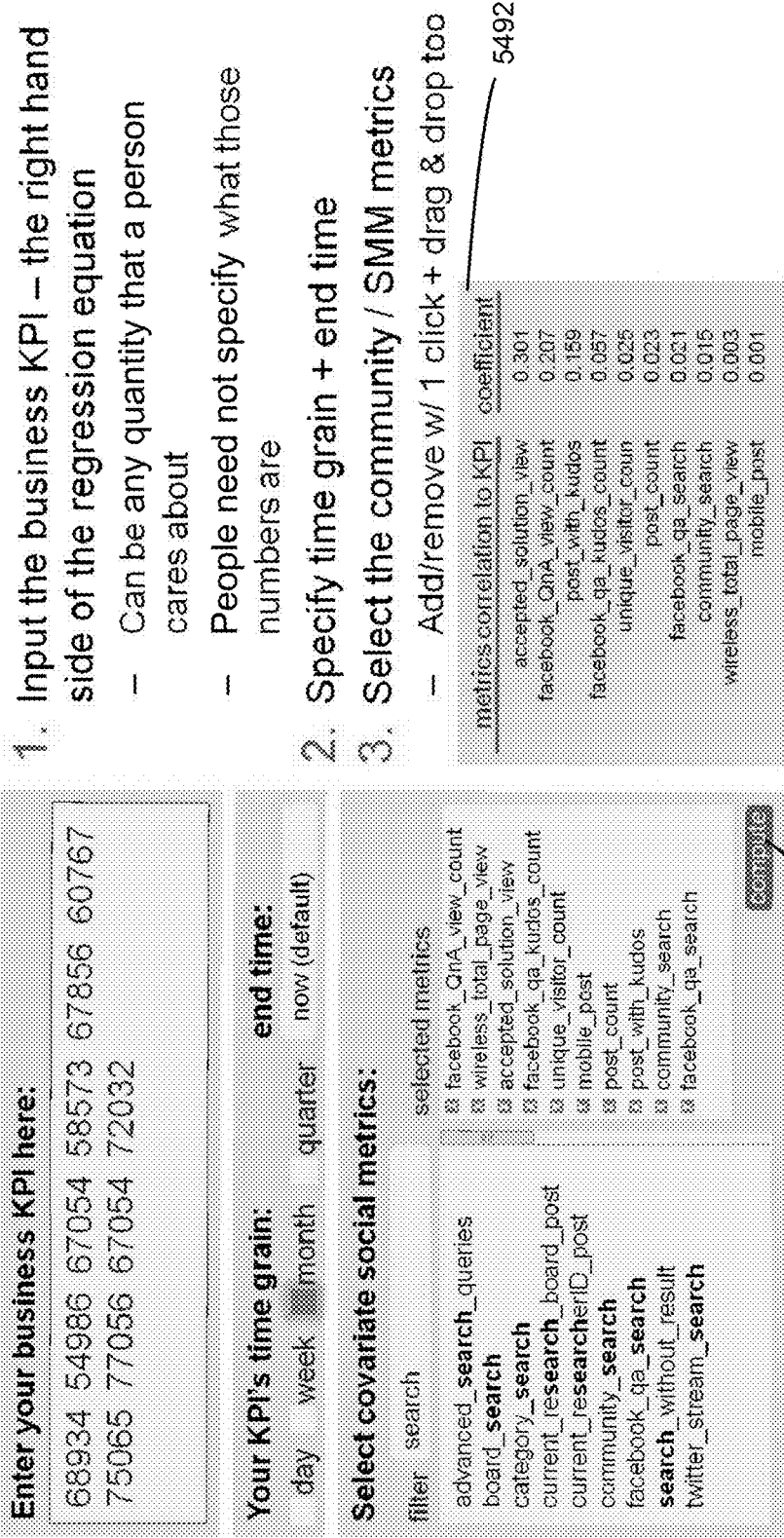
Figure 5I:
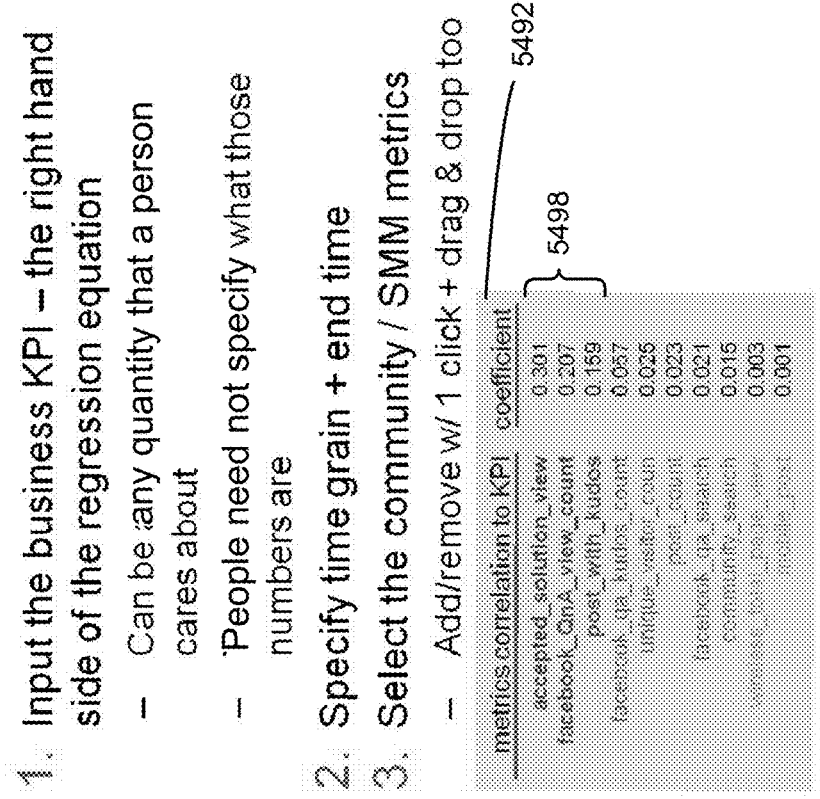
Figure 5I:
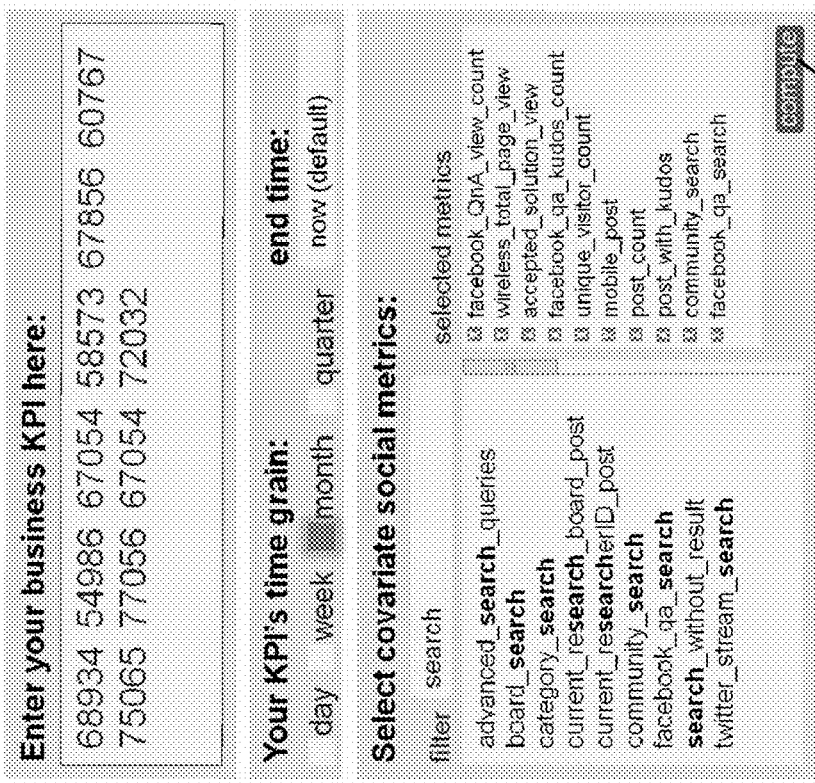

In response (418) to receiving the input, the device obtains (420), from a data set associated with the entity, data that corresponds to a plurality of metrics in accordance with the time range information, (e.g., as shown in FIGS. 5W-5GG). The data set is (422), optionally, accessible to a second party (different from the first party) that does not have direct knowledge of the key performance indicators. Thus, in some implementations, a business owner with sensitive financial information does not provide the full financial information to a data analysis service. In some implementations, the first party, with knowledge of the key performance indicators, does not have (424) direct access to the data set associated with the entity (e.g., a data analysis service does not provide a business owner with full access to the underlying data generated by the data analysis service).

In response to receiving the input, the device also determines (426) correlations between the plurality of metrics and the sequence of numbers, wherein a correlation between a respective metric and the sequence of numbers is determined based on a comparison between data corresponding to the respective metric (e.g., data generated using the respective metric) and the sequence of numbers. In response (418) to receiving the input, the device also provides (428), to the first party, a result indicative of a respective correlation between one or more of the metrics and the sequence of numbers (e.g., as shown in FIGS. 5HH-5II). In some implementations, providing the result includes displaying the result to the first party. In some implementations, providing the result includes providing data enabling presentation (e.g., display) of a representation of the result to the first party.

In some implementations, the result includes (430) information identifying a metric of the plurality of metrics with the highest correlation to the sequence of numbers. (e.g., "accepted_solution_view has a highest correlation to the sequence of numbers shown in FIGS. 5HH-5II). In some implementations, the result includes (432) a list of identifiers for multiple metrics of the plurality of metrics, and the list is ordered in accordance with a degree of correlation between respective metrics in the plurality of metrics and the sequence of numbers (e.g., the list of metrics is ordered by value of a correlation coefficient, as shown in FIGS. 5HH-5II). In some implementations, the result includes (434) a list of identifiers for multiple metrics of the plurality of metrics and identifiers in the list that correspond to metrics that have a correlation with the sequence of numbers that is above a correlation threshold are visually emphasized in the list. In some implementations, the identifiers for the metrics with the highest correlation are shown in a different color, at a larger size, or in a different font than the identifiers for the metrics with the lowest correlation (e.g., the list of metrics is ordered by value of a correlation coefficient, with higher ranked metrics shown in a different color and with a bold font as compared with lower ranked metrics, as shown in FIG. 5II).

It should be understood that the particular order in which the operations in FIGS. 4A-4B have been described is merely an example and is not intended to indicate that the described order is the only order in which the operations could be performed. One of ordinary skill in the art would recognize various ways to reorder the operations described herein. Additionally, it should be noted that details of other processes described in U.S. Provisional Patent Application No. 61/734,927, filed Dec. 7, 2012, entitled "Systems and Methods for Presenting Analytic Data" with respect to other methods described therein (e.g., methods 400, 500, 600 and 700 in U.S. Provisional Patent Application No. 61/734,927) are also applicable in an analogous manner to method 400 described above with respect to FIGS. 4A-4B. For example, the inputs, data display panels, data selection interfaces, and data-set dimensions described above with reference to method 400 optionally have one or more of the characteristics of the inputs, data display panels, data selection interfaces, and data-set dimensions described in U.S. Provisional Patent Application No. 61/734,927, filed Dec. 7, 2012, entitled "Systems and Methods for Presenting Analytic Data" with reference to other methods described therein (e.g., methods 400, 500, 600 and 700 in U.S. Provisional Patent Application No. 61/734,927). For brevity, these details are not repeated here.

Participation in an online community or other social media generates a lot of data. For example, when a user posts a question, comment, or answer, the post itself is recorded, as well as the date/time of the post, who made the post, etc. Different people related to the community or social media are interested in different aspects of the data. In some implementations, the parties who review the data (e.g., users of the device described above) are categorized into three roles, including Managers, Stakeholders, and Executives.

A manager is someone who participates in the day-to-day management of an online community platform. Manager reviews the direct measurements of participation by community members. For example, a manager would review raw metrics such as the total number of posts, the total number of posts of specific types (e.g., questions, answers), the number of fans, the number of discussion threads and the lengths of those threads, the number of times particular content is viewed by users, the comments or ratings received by each particular user and/or posts, and so on. These quantities are directly measurable by clicks, button presses, and other recorded user interactions, and constitute level 1 data. In general, the level 1 data reviewed by managers comprises raw metrics and simple reports based on the raw metrics.

A business stakeholder is someone who derives business value from the online community. Business stakeholders are less interested in the raw metrics collected about a community, and are more interested in data that shows the success or effectiveness of an online community or other social media. For example, a stakeholder reviews market share or share of the advertising in the market, or other data that demonstrates how well the media content resonates with the participants of the community. The data of interest to the business stakeholders are actionable analytics generated from the raw metrics. Various statistical and analytical techniques can be used to generate the analytics from the raw metrics. Frequently the actionable analytics have complex and non-linear relationships with the raw metrics from which the analytics are derived. The level 2 data reviewed by business stakeholders comprises actionable analytics.

Finally, business executives review data that ties social media directly to business objectives. Generally, the business objectives are financial, such as revenue or profit, but also include less tangible objectives such as customer satisfaction. The level 3 data reviewed by business executives comprise key performance indicators (KPI's), return on investment (ROI), and so on. The level 3 data is derived from the raw metrics and the actionable analytics associated with the community, as well as additional data (e.g., returns, revenues, and customer satisfaction metrics) provided by the entity using the community to promote its business objectives.

FIGS. 5A-5II below describe a user interface displayed on a display that is coupled to a computing device with one or more processors and memory that store programs that are configured to be executed by the one or more processors. Below, when a user is described as performing an operation associated with a displayed user interface (e.g., selecting an option, activating an affordance, or the like), the computer is detecting an input provided by the user (e.g., using a user input device such as a mouse, a touchpad, a keyboard, voice commands, etc.), and the computing device is responding to the detected input by updating the user interface and/or performing an associated operation in accordance with the detected input. Thus, for example, when a user "selects a time range to be displayed," the device is detecting an input generated by a user with an input device (e.g., a mouse, trackpad or keyboard) that corresponds to selecting the time range, and the device is responding to the input that corresponds to selecting the time range by selecting the time range.

FIGS. 5A-5G illustrate how some implementations present analytic data on a display of a device (e.g., a display of device 110). One useful derived metric is a Community Health Index 5278, which is sometimes referred to as "CHI." A community health index can be computed in various ways based on many distinct raw metrics discussed previously. In some implementations, the community health index is computed as a function of several community health factors 5282. In some implementations, the community health index is computed as a simple sum of the identified health factors, but in other implementations, the calculation uses a more complex formula. The illustrated implementation uses a more complex formula: the calculated community health index is 491, whereas the sum of the health factors 5282 is 96+89+82+70+88+90=515. In some implementations, the display of the community health factors 5282 includes both a score for each factor as well as a percent change from the prior measurement. In some implementations, the community health factors 5282 and community health index 5278 are computed weekly, as indicated in the community health index chart 5280. In some implementations, data for the community health index, community health factors, or other data can be exported, using buttons 5284 for example. In some implementations, each of the export buttons 5284 identifies the type of export file (e.g., PNG for a portable network graphics file, CSV for a comma-separated values file, or PDF for an Adobe Acrobat portable document format file). FIG. 5B presents additional data as tables 5286.

FIGS. 5C-5G identify alternatives to tabular data presentation. FIG. 5C shows a table 5288 of the top ten superusers for an online community. Although they are listed in order based on the users' post frequencies, the relative sizes of the post frequencies are not apparent in this format. FIG. 5D includes the same data, but presents each user in a bar graph 5290, which shows the relative sizes of the users' post frequencies. FIG. 5E presents the same data, but places each superuser inside a circle whose size is proportional to the post frequency of the superuser. This data visualization 5292 shows the relative size of each user's posts. Finally, FIG. 5F provides a display 5294 of superusers, in which the each user's name (or ID) is displayed with size proportional to the user's post frequency.

FIGS. 5F and 5G illustrate an implementation of a user interface with multiple ways to present the post frequency data for the superusers. In these examples, the graphical display 5294 in FIG. 5F includes a "view list" button 5296, which links to the list 5288 in FIG. 5G. Conversely, the list 5288 in 5G includes a "view graph" button 5298, which links to a graphical display of the same data. These examples illustrate ways in which implementations are customizable and present data with clarity and in a user-friendly format.

Some implementations of the user interfaces described in FIGS. 5A-5G provide pre-defined analytic widgets, which provide important analytic data. For example, some implementations compute a Community Health Index (CHI), which is a single number that identifies the overall health/success of an online community. As illustrated in FIG. 5A, many different quantities can be combined to compute a community health index. Some implementations also compute a Facebook Engagement Index (FEI), which is a single number that roughly identifies users' engagement with a Facebook site or page. Such an engagement index can also be computed for other social media sites. Some implementations provide analytic widgets for other topics or quantities as well, such as, but not limited to, superusers, hot topics, or referrers.

Some implementations described in FIGS. 5A-5G provide customizable dashboards, in which viewers of the analytic data control which widgets they see, and where they are located. This is described in more detail below with respect to FIGS. 5H-5S. In some implementations, there are user-defined widgets in addition to the predefined widgets (5300). One a widget is constructed, it can be reused anywhere in the user interface—they are searchable and discoverable. In some implementations, user-defined widgets can be shared with other individuals, even individuals who review data for distinct online communities.

FIGS. 5H-5S illustrate an example graphical user interface 5340 to present analytics and other data for an online community. The level 1 data (i.e., raw data) is provided in the metric explorer interface, and accessed by icon/button/menu tab 5304. This is described in greater detail with reference to FIGS. 9-005 to 9-149 of U.S. Provisional Patent Application No. 61/734,927, filed Dec. 7, 2012, entitled "Systems and Methods for Presenting Analytic Data". Graphical user interface 5340 provides access to level 2 analytic data through icon/button/menu tab 5306, to be described in more detail below with respect to FIGS. 5I-5S. Graphical user interface 5340 provides access to level 3 ROI (return on investment) and KPI (key performance indicator) data using icon/button/menu tab 5308. In some implementations, the graphical user interface 5340 provides access to additional information, features, or configuration using additional buttons, icons, or menu tabs 5310.

When the analytics tab 5306 is selected, the user interface provides a set of dashboards, such as the dashboards "support" 5312, "marketing" 5314, and "R&D" 5316. This is illustrated in FIG. 5I. In some implementations, there are some dashboards that are predefined, and others that are user defined. In some implementations, the predefined dashboards are created by default, but can be edited or deleted just like a dashboard created from scratch. FIG. 5J illustrates that dashboards can be deleted. In some implementations, dashboards can be deleted by clicking on or otherwise selecting an "X" adjacent to a dashboard name. In some implementations, a dashboard can be deleted by selecting the dashboard (e.g., by clicking), then pressing the "Delete" button on the keyboard. In some implementations, dashboards can be deleted by selecting a dashboard with a click of the right mouse button and selecting "Delete" from a contextual popup menu. In some implementations, deleting a dashboard removes the dashboard form the display, but all of the information about the dashboard is retained, so that the dashboard could be subsequently reinstated if desired.

FIGS. 5K and 5L illustrate that new dashboards can be added. In some implementations, the user interface includes an "add dashboard" button 5318. When clicked or selected, a popup window (not shown) prompts for entry of a dashboard name, and then the new dashboard displays, such as new dashboard "traffic and SEO" 5320.

FIG. 5M illustrates that each dashboard displays a set of analytics widgets. In this figure, dashboard "support" 5312 has been selected, and this dashboard includes the Community Health Factors widget 5282, the Community Overview widget 5322, and Community Activity widget 5324. Each of these widgets displays a certain set of data, as defined by the widget.

FIGS. 5N-5Q illustrate that additional analytics widgets can be added to a dashboard, such as dashboard 5312. Clicking on an "add analytics" button 5326 (or selecting the appropriate toolbar icon or menu item) brings up a pop-up window 5338 for selecting an analytics widget. In some implementations, when there is a small number of selectable widgets, all of the selectable widgets are displayed in the popup windows 5338 (with scroll bars if necessary). In many instances, there are many selectable widgets, so some implementations have a two part selection process. As shown in FIG. 5O, the user interface includes a search box 5328 by which terms describing the desired widgets can be entered. As shown in FIG. 5P, the term "community health" has been entered, and there are two matching widgets in the widget list 5330. Of course widgets that already appear on the dashboard do not appear in the widget list, even if they match the search terms. For example, the Community Health Factors" widget 5282 matches the search phrase "community health" but is already displayed in the support dashboard 5312, so it does not appear in the widget list 5330. In FIG. 5Q, the Community Health Compass widget 5332 is selected from the list 5330 (e.g., by clicking), so it displays in the support dashboard 5312 in the next open location.

FIGS. 5R and 5S illustrate that widgets can be moved within a dashboard. In these figures, widgets 5324 and 5332 have been switched. There are many ways that these widgets can be moved, such as dragging and dropping, selecting and moving with cursor keys, or even deleting the widget 5324 and re-adding widget 5324 after widget 5332 has automatically moved up. In some implementations, when any user builds a new widget, the new widget becomes available for other users who are using the analytics interface. In some implementations, the user building a new widget can specify whether it should be available for others. In some implementations, a notification system optionally alerts a user when new widgets are available.

One way to measure the value of an online community for a business organization is to compare the costs for maintenance of the community to the cost savings based on call deflection. That is, when end users are able to get questions answered or resolved through the online community rather, the business has direct savings in customer support (e.g., reflected in the number of call deflections). Another way to measure success of a business online community is its relationship to search engine optimization (SEO). An online community for a business can have a direct impact on what results appear in search engines, and the order in which the results appear. Therefore, the investment in an online community can reduce SEO costs. Another measurable benefit of an online community for a business is the creation of superusers and superfans, who both help others in the community and promote the business to others. Even though each of these measures is useful, it is a "fixed" calculation, and not customized to a specific business entity. Business entities have many other key performance indicators (KPIs) which are relevant to their business, and it would be useful to correlate those KPIs with metrics about an online community for the business. For examples, business entities will, in some circumstances, focus on sales, the Net Promoter Score (NPS), the Customer Satisfaction Score (CSAT), the conversion rate for sales leads, number of deals closed, repeat purchasers, etc. There is no simple way to create enough "fixed" calculations to satisfy the needs of all business entities. Furthermore, much of the data behind key performance indicators is highly confidential, and thus business executives are frequently not willing to release their critical data to a software vendor of the RIO calculators and rely on the security measures provided by that vendor. In addition, owner of the metrics data will, in some circumstances, also want to keep the data confidential for various purposes (e.g., for user privacy purposes).

The following implementations illustrate a method to address these problems by providing a general purpose process to correlate any key performance indicator to metrics for social media. As explained below, the implementation computes correlations between provided key performance indicators and various metrics without risking the security of the underlying key performance data and the metrics data. In the example described in FIGS. 5T-5II, a double-blind interface is provided for a first party holding the key performance indicators, and a second party holding the metrics data, and correlation between the key performance indicators and the metrics data are computed without requiring the first party revealing the nature or identity of the key performance indicators to the second party, and without requiring the second party revealing the actual metrics data to the first party.

FIGS. 5T-5II illustrate an example of an implementation of a software interface that produces correlation information between a sequence of business key performance indicator values with one or more metrics from an online community or other social media. FIG. 5T illustrates an example of a user interface that provides a KPI entry window 5442. A user (e.g., an executive) enters Key Performance Indicator (KPI) data (e.g., a sequence of numbers), without identifying the nature (e.g., units) of those KIP number. In other words, only pure numbers are provided, the provider of the KPI numbers do not have to indicate whether the numbers represent revenues, profits, increase in sales, or any other proprietary key performance indicators.

In some implementations, is the KPI entry window 5442 is implemented as a single text entry box, but in some other implementations, this is implemented as a grid or an array. In some implementations, the sequence of KPI numbers can also be uploaded as a data file written according to a particular format.

In FIG. 5T, a user (e.g., an executive) has entered some KPI data 5444 (e.g., a sequence of 10 numbers). In this example, the data entries are separated by blank spaces, but other separators can be used as well. In some implementations, commas are permitted within numbers (e.g., "42,195" to identify the number forty-two thousand, one hundred and ninety five), but in some other implementations, commas are precluded to avoid confusion. In some implementations, commas are used as separators between numeric entries. Some implementations permit other characters as separators as well (e.g., "|"). In implementations that use a grid or array input screen, the grid cells themselves serve as separators between the entries, so there is no ambiguity about what characters are used as separators.

As shown here, the user entering the data need not specify what the data represents, so there is greatly diminished risk of having key proprietary business information exposed to a third party (e.g., the owner of the metrics data or the provider of the software application. In fact, in some cases, the data can be further obfuscated by scaling. For example, if profit for three consecutive months were 2.56M, 2.78M, and 2.67M, these could be scaled by dividing by 5000, to yield the values 512, 556, and 534. Entering "512 556 534" into the KPI window 5442 would not risk exposure of the real data. Scaling helps to obscure the data, but does not affect the objective of finding correlations to social media metrics.

In order to correlate the KPI data 5444 with metrics data, the time range associated with the KPI data is required. That is, each data entry in the KPI data 5444 is associated with a specific period of time, and the sequence of entries corresponds to a consecutive sequence of time periods. FIG. 5T illustrates that the user interface also includes a time specification panel 5446 to specify both the time grain (time step size) and the time boundary (e.g., an end time). In some implementations, the time specification panel 5446 includes selection options 5448 to specify the time grain (e.g., time step size). In some implementations, this is implemented as a group of option buttons 5448, but other implementations use alternative user interface controls, such as a drop down box. In some implementations, the time range is specified based on both the time step size and the end time 5450. In many or most cases, a user is interested in data up to the present, so it is simpler for a user to specify the end time rather than the start time. Because the user has already specified the number of data points (e.g., by the total count of the sequence KPI numbers provided), the time step size, and the time boundary, the time range can be computed easily based on the number of time periods, the time boundary (e.g., an end time or a start time), and the time step size. In FIG. 5U, a user has selected the month time grain 5452, so each of the entries in the data 5444 represents a KPI value for one month. In some implementations, the time range information is provided based on a total time period (e.g., 1 year ending on Jan. 1, 2012), and the time step information is derived from the number of KPI data points provided (e.g., 12).

In some implementations, the next step is to compute the correlation between the KPI data entered and one or more available social media metrics. In some implementations, the most highly correlated metrics are presented in a window, such as the window 5492 in FIG. 5HH. However, with potentially thousands of metrics to test, a typical computer optionally does not process all of the potential metrics quickly enough, so in some implementations, a metric selection panel 5454 is provided to allow a user to select a certain number of metrics to test. This is illustrated in FIG. 5V. In some implementations, a user optionally selects up to a certain number (e.g., 10 or 25) metrics to test for correlation. In some implementations, there is no imposed limit on the number of metrics to test, and a user can choose to test hundreds (or all metrics) at the same time. In implementations that allow testing of many metrics simultaneously, the user interface optionally provides visual feedback to indicate the status of the testing (e.g., estimated time remaining, percent complete, etc.). In the implementation illustrated in FIGS. 5V-5GG, 10 metrics are provided for selection by the user to test. In some implementations, a number of recommended metrics are provided in the user interface for selection by the user.

As illustrated in FIG. 5W, the metric selection panel 5454 enables selection of metrics with filters 5456. In FIG. 5W, a user has entered the filter string "view" 5458, and the corresponding metric list 5460 includes all metrics that include the filter string 5458. In some implementations, the filter string 5458 is highlighted where it appears within each of the metrics, for example, using a bold typeface. In FIG. 5X, a user selected the metric "facebook_QnA_View_count" 5462 by clicking while cursor 5038 is over "facebook_QnA_View_count," as shown in FIG. 5W, and thus metric 5462 is displayed in the selected metrics list 5464. In FIG. 5Y, a user has selected a second metric "page_view" 5466, again by clicking while cursor 5038 is over "page_view," as shown in FIG. 5X. The selected metrics list 5464 refreshes to display the two selected metrics (e.g., facebook_QnA_view_count, and page_view). In FIG. 5Z, a user has clicked on the metric "wireless_total_page_view" 5468, and thus it is displayed in the selected metric list 5464 as well.

FIGS. 5Z and 5AA illustrate that metrics in the selected metrics list 5464 can be removed. Here, the metric "page_view" has been removed, for example, by clicking on the close box 5500 associated with the "page_view" metric in the selected metrics list 5464 while cursor 5038 is over close box 5500, as shown in FIG. 5Z. There are many ways to remove an entry from a list in a graphical user interface, such as drag and drop, using a right click and selecting "Remove" from the popup menu, and so on which are optionally used by a user to remove entries from the selected metrics list 5464.

In FIGS. 5BB and 5CC, a user enters another filter string "accepted" 5458, so the user interface displays the matching metrics 5460 for "accepted". The user then selects the "accepted_solution_view" metric 5470 in the list of search results by dragging it and dropping it into the selected metrics list 5464 (e.g., by pressing a mouse button and moving cursor 5038 across the screen from the position shown in FIG. 5BB to the position shown in FIG. 5CC).

As shown in FIG. 5DD, the user has continued to select metrics (e.g., by searching for different metrics and clicking on representations of metrics in search results) so that ten metrics are selected. In FIG. 5EE, a user has attempted to add the metric "facebook_qa_search" 5486 (e.g., by clicking while cursor 5038 is over "facebok_qa_search," as shown in FIG. 5DD), which would exceed the imposed 10 metric limit. The user interface displays a message, such as message 5502, informing the user that the limit has been reached, and that another metric must be removed before the additional metric 5486 can be added. In some implementations, the error message 5502 displays as a popup alert box. In some implementations, the user interface displays a "limit reached" indicator (not illustrated) as soon as the ten metric is reached, so that a user is aware of the limit before attempting to add an eleventh metric.

In FIGS. 5EE and 5FF, a user removes the selected metric "sessions" 5488 from the selected metrics list 5464. The user removes the metric 5488 by clicking on the close box 5504 (e.g., while cursor 5038 is over close box 5504 as shown in FIG. 5EE) or dragging the metric 5488 outside of the selected metrics list. Now that the selected metrics list has only nine metrics, the user can add the "facebook_qa_search" metric 5486 to the selected metrics list, which is illustrated in FIG. 5GG. As noted earlier, this is accomplished by clicking on the metric 5486 (e.g., while cursor 5038 is over "facebook_qa_search," as shown in FIG. 5FF), or dragging and dropping into the selected metrics list 5464.

FIGS. 5HH and 5II illustrate computing and displaying the correlation between each of the selected metrics in the list 5464 with the KPI data 5444 (e.g., in response to detecting activation of a compute affordance such as mouse click while cursor 5038 is over compute affordance 5490 in FIG. 5GG). The correlation data is displayed in a window or panel 5492, with a list 5494 of selected metrics and a corresponding list 5496 of correlation coefficients. In some implementations, the list of metrics 5494 are displayed in the same order as they appear in the selected metrics list 5464. In some implementations, the list of metrics 5494 are displayed alphabetically by the names of the metrics. In the illustrated implementation, the metrics are ordered based on their correlation coefficients, with the highest correlation appearing first. As illustrated in FIG. 5II, some implementations use color to identify relative size of the correlation. In some implementations, the first three metrics 5498 have relatively higher correlation coefficients, and are displayed in various shades of red, whereas the metrics with much smaller coefficients display with lighter shades of red or other colors. In some implementations, the metric having the highest correlation coefficient with the KPI numbers is identified. In some implementations, the correlation assessment results include metrics whose correlation coefficients are above a predetermined threshold value.

In this example, whatever the KPI is represented by the data 5444 correlates most strongly (of the selected metrics) with users viewing accepted solutions. From a business perspective, this shows the value of having designated accepted solutions. There is also a good correlation to viewing Facebook Q&A. A business executive might review the information in the Facebook Q&A to understand why it would correlate with a business KPI.

Figure 6:
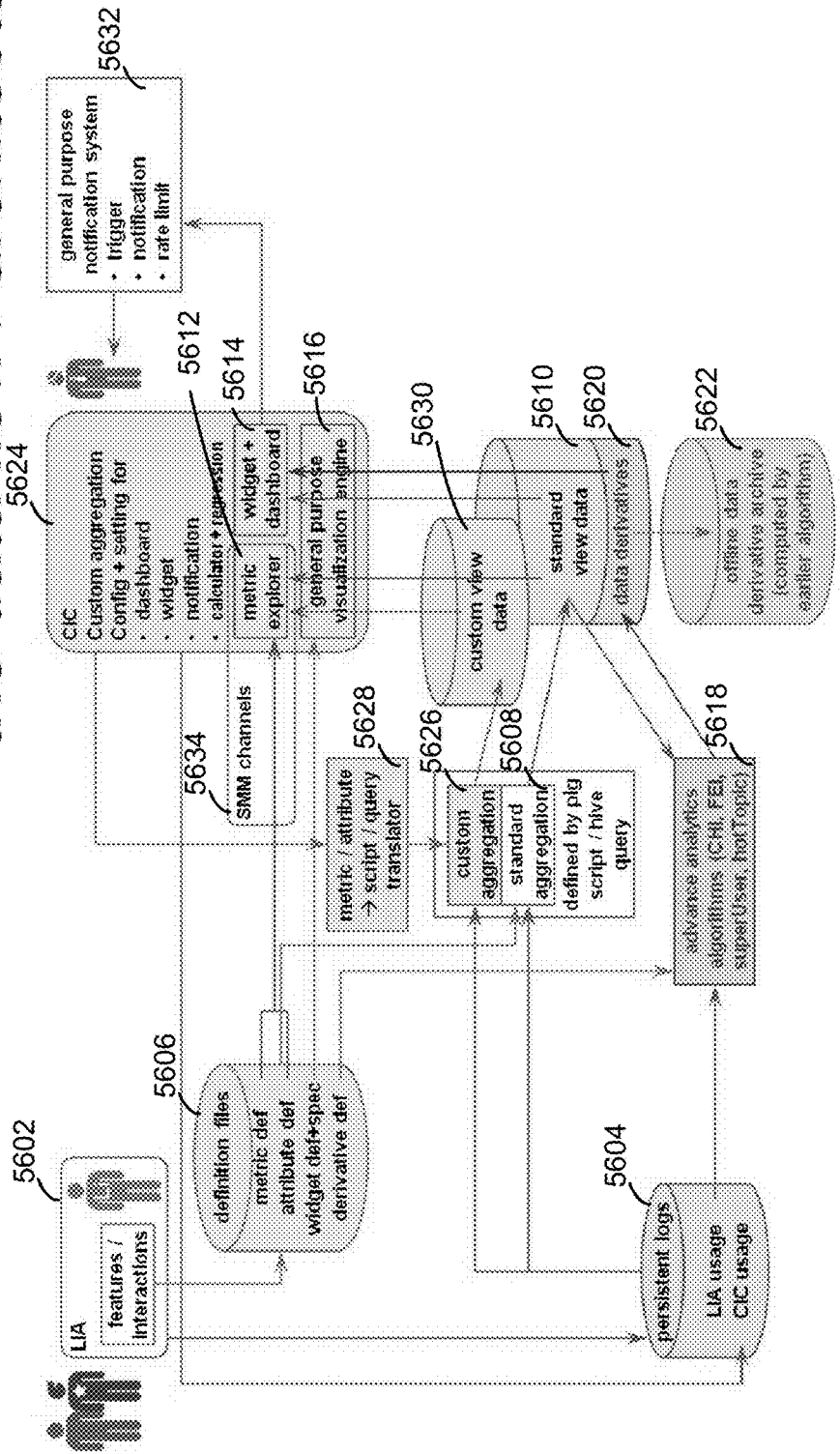
FIG. 6 illustrates an example of a data flow and architecture for collection of analytics data for an online community and presentation of analytic data for that online community in accordance with some implementations.

FIG. 6 illustrates examples of a data flow and architecture supporting the level 1, level 2 and/or level 3 data reporting and visualization, e.g., in the widgets, and dashboards described above. FIG. 6 is merely illustrative, and in actual implementations, more or fewer components are, optionally, used than those shown. In addition, some components optionally support a different set of functions than those described.

As shown in FIG. 6, application 5602 ("LIA") provides the platform that supports one or more online communities, e.g., online communities associated with various business entities (e.g., retailers, cosmetic companies, consumer electronics companies, etc.). The users (e.g., users 102 in FIG. 1) of the online communities generate content (e.g., blog posts, reviews, comments, ratings, answers, replies, etc.), and data related to their interactions (e.g., posting, rating content, registration, replying to questions, providing comments, etc.) with the communities are stored in persistent log 5604. Persistent log 5604 is scalable, fault tolerant, and has built-in redundancy to guard against failures. Persistent log 5604 stores all the data associated with the user interaction with the online communities (e.g., community interaction logs 324, forum data 326 and the like are stored at a database server 118 that is associated with online community 100 as shown in FIGS. 1 and 3). The data includes, for example, data related to the "who", "what", "when", and "where" aspects of the user interactions with the online communities. In addition, attributes information (related to the "how" aspect) is also stored in association with the "what" aspect of the data.

In some implementations, as shown in FIG. 6, metrics and attributes are defined by the designer of application 5602, and the definitions of the metrics and attributes are stored in a definition store 5606. In general, metrics are raw data concerning various actions or interactions performed by the users of the communities. Examples of metrics include page views, posts, kudos, answers, replies, registrations, comments, logins, etc. Attributes generally refer to the context information (e.g., device type, time, community name, topics, keywords, etc.) associated with particular actions or metrics. Sometimes, attributes also include environmental variables associated with particular actions or metrics. In some implementations, the definitions of metrics and attributes are stored as definition files, and definitions files can be modified, added, and/or deleted from the definition store 5606.

In some implementations, as shown in FIG. 6, based on the definitions of metrics and attributes, some standard aggregation 5608 are defined and stored. Examples of standard aggregations 5608 include total views, average number of posts per day, average response time, total number of posts, etc. These standard aggregations are simple computations (e.g., additions, multiplications, averages, etc.) based on the raw interaction data recorded for the communities and stored in the persistent logs 5604. The standard aggregations 5608 can be easily defined using various scripting language, and can be retrieved by queries.

In some implementations, as shown in FIG. 6, standard aggregations computed based on actual data recorded on the communities are stored as standard view data 5610. The standard view data 5610 can be quickly retrieved and displayed to a viewer (e.g., a community manager, stakeholder and/or executive) via the widgets, and/or dashboards described above. As shown in FIG. 6, metric explorer 5612 (e.g., the user interfaces described with reference to FIGS. 9-005 to 9-141 and 9-171 to 9-206 of U.S. Provisional Patent Application No. 61/734,927, filed Dec. 7, 2012, entitled "Systems and Methods for Presenting Analytic Data"), and widgets (e.g., the widgets described above with reference to FIGS. 5A-5S) and dashboard 5614 are supported by a general purpose visualization engine 5616. The metric explorer 5612, widgets and dashboard 5614, and the general purpose visualization engine 5616 access the standard view data 5610 directly and present the standard aggregations and raw metrics to the user, e.g., using the example user interfaces described earlier. One advantage of computing and storing the standard view data 5610 is fast response time during interaction with the metric explorer 5612 and the widget and dashboard 5614, as indicated in FIG. 6.

In some implementations, in addition to the standard aggregations, more complex analytics and metrics (also referred to as advanced analytics 5618) are defined, as shown in FIG. 6. For example, advanced analytics algorithms are used to compute various community health factors (e.g., CHI, FEI, etc.). Other advanced analytics include metrics for measuring influence of users, hotness of topics, etc. Typically, these more advanced analytics are not simple aggregations of raw interactions data recorded on the communities. Instead, more complex algorithms (e.g., statistical methods, machine learning methods, non-linear analysis, etc.) are used to derive these analytics. Typically, these analytics have a non-linear relationship with the various metrics used to derive the analytics. In addition, these advanced analytics typically are based on a large number (e.g., hundreds) of standard metrics.

In some implementations, the definitions of the advanced analytics 5618 (also referred to as "derivative definitions") are stored with the metric definitions and attribute definitions in the definition store 5606. In some implementations, the advanced analytics algorithms are implemented using various computing languages (e.g., matlab, Java, etc.), as shown in FIG. 6. In some implementations, as shown in FIG. 6, persistent log 5604 and standard view data 5610 both serve as the data sources for computing the advanced analytics 5618. In some implementations, data derivatives 5620 computed based on actual metrics data according to the advanced analytics algorithms are stored with the standard view data 5610, for quick retrieval and presentation by the metric explorer 5612 and widget and dashboard 5614, as shown in FIG. 6.

In some implementations, as shown in FIG. 6, an offline data derivative archive 5622 is implemented to store prior versions of the data derivatives. In some implementations, the advanced analytics algorithms are continuously improved and revised overtime, and the data derivatives 5620 derived using the older versions of the advanced analytics algorithms are stored in the offline data derivative archive 5622 with the their respective version numbers. In some implementations, the data stored in the offline data derivatives archive 5622 are used to evaluate the effectiveness of the advanced analytics algorithms, and provide benchmarking and comparison data for evaluating and validating the algorithms.

As described in earlier parts of the specification and shown in FIG. 6, a customer intelligence center 5624 is used to provide integrated data service for community managers, and stakeholders and executives of business entities providing the online communities. The customer intelligence center 5624 is an integrated suite of services, providing the metric explorer, and widgets and dashboard for users to selectively review data associated with various online communities. As described earlier, the customer intelligence center 5624 (e.g., as illustrated by user interface in FIGS. 5A-5S above) not only provides standard, predefined metrics, and advanced analytics to the users, but also allows users to define customized metrics and customized user interfaces (e.g., metrics explorers, widgets and dashboards), customized reports and visualizations. In addition, the customer intelligence center 5624 also allows a user (e.g., community manager, stakeholder, and executive) to establish a notification system which sends an alert to the user when certain predefined trigger conditions have been met. For example, a trigger condition can be a threshold value of a particular metric or data derivative, and/or a combination of different threshold values for a number of metrics and data derivatives. The customer intelligence center 5624 access data stored in the standard view data 5610 and data derivatives 5620 to support its functions.

Since the customer intelligence center 5624 allows a user to customize the metrics, aggregations, and data derivatives that can be reviewed in the customer intelligence center 5624. The definitions 5626 of the customized metrics, aggregations, and data derivatives are stored with the standard aggregations 5608. In some implementations, a metric/attribute to script/query translator 5628 is implemented and used to provide an interface between the customer intelligence center 5624 and the customized aggregations 5626 and standard aggregations 5608.

In some implementations, the data calculated according to the customized metrics, aggregations, and analytics are stored as custom view data 5630. The custom view data 5630, standard view data 5610, and data derivatives 5620 (e.g., as stored in database server(s) 118) together serve as the data source for the reports and visualizations shown to users via the metric explorer and the standard and customized widgets and dashboards (e.g., the user interfaces described above with reference to FIGS. 5A-5II above and FIGS. 9-005 to 9-236 of U.S. Provisional Patent Application No. 61/734,927, filed Dec. 7, 2012, entitled "Systems and Methods for Presenting Analytic Data"). By storing the custom view data 5630, standard view data 5610, and data derivatives 5620, the responsiveness for the metric explorer and widgets and dashboards can be improved.

In some implementations, as shown in FIG. 6, definitions of the customized metrics, aggregations, widgets, and reports are stored in the definition store 5606, together with the definitions of standard metrics, attributes, and data derivatives. In some implementations, the stored definitions of the customized metrics, aggregation, widgets, and reports are reused by their creators. In some implementations, the stored definitions of the customized metrics, aggregation, widgets, and reports searchable and utilized by other users who, in some circumstances, will find them useful for reviewing their own community data in the customer intelligence center 5624.

In some implementations, the customer intelligence center 5624 allows a user (e.g., community manager, stakeholder and/or executives) to establish the criteria for having notifications sent to a user-specified recipient. In some implementations, a general purpose notification system 5632 is utilized. A user defines the trigger event for the notification, the type of information to be included in the notification, the format of the notification, and a rate limit for the notification. Examples of trigger events for a notification include a community health indicator (e.g., CHI) value having dropped below a threshold value, an average response time for a particular sub-community having reached a maximum acceptable value, new registration rate having dropped below a minimum threshold value, etc. In some implementations, a trigger event can also be a combination of several conditions. In some implementations, the user is allowed to specify what information the notification would include. For example, the user can require the notification to include actual values of certain metrics and data derivatives, and/or visualizations and reports of certain metrics/time periods/channels/users, etc. In some implementations, the notifications are provided as an email alert, a text message, or some other kinds of messages. In some implementations, the user is allowed to specify a preferred rate limit for the notifications. For example, a rate limit of 2 notifications per day means even if a trigger event has been met more than twice in a particular day, only two notifications are sent to the user. In some implementations, each notification sent to the user can include an aggregated report related to multiple trigger events that have occurred in the past but not yet been notified to the user due to the rate limit. The rate limit allows the user to control the number of notifications received each month/day/hour, so that the user is not overwhelmed by too many notification messages.

As described earlier, the metric explore 5612 is able to present community data on various metrics filtered by various attributes. The metrics explorer 5612 obtains the definitions of the metrics and attributes from the definition store 5606. In addition to the interaction data recorded on the online communities supported by the platform application 5602, in some implementations, the metric explorer also provides data from other third-party channels 5634, as shown in FIG. 6. For example, data from third-party channels, such as third-party blogs, micro-blogs (e.g., twitter), social networks (e.g., Facebook, Google+, etc.), and other social media (e.g., Youtube, Flickr, etc.), can be selectively presented in the metric explorer as well. The integration of social media channels 5634 into the metric explorer allows users to have a broader view of the impact and health of their online communities and business objectives.

In some implementations, as shown in FIG. 6, persistent logs 5604 also store data related to the usage of the customer intelligence center 5624, such as what customization the user has made to the metrics explorer, widgets and dashboards, what customized metrics, aggregations, reports, and widgets have been created by the customers, what notifications have been implemented by the customers, how frequently each types of metrics, aggregations, data derivatives are reviewed by the customers, what times periods the customers typically wish to review, etc. The data related to the usage of the customer intelligence center 5624 can be used to generate additional definitions that are useful for many other customers. The usage data can also be used to determine what standard and customer view data to compute and store for easy and fast access. The usage data is in general useful for improving the overall efficiency and usability of the customer intelligence center.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
at a computing device with one or more processors and memory:
displaying a user interface for correlating a key performance indicator of a business entity with metrics for an online social community for the business entity, wherein the user interface includes a data entry region for a user to input values of the key performance indicator, a time grain region, and a metric region, and wherein the user interface has no direct access to key performance indicator data for the key performance indicator of the business entity;
receiving, in the data entry region, a first user input to specify a sequence of numbers representing values of the key performance indicator for a range of consecutive time periods;
receiving, in the time grain region, a second user input to specify the range of consecutive time periods and a size of the time periods;
receiving, in the metric region, a third user input to select one or more metrics for the online social community; and
in response to receiving the first, second, and third user inputs:
computing each of the selected one or more metrics for the specified range of time periods, aggregated according to the user specified size for the time periods, thereby forming a respective sequence of metric values corresponding to each of the selected one or more metrics;
for each of the selected one or more metrics, determining a respective correlation between the respective sequence of metric values and the sequence of numbers; and
providing, in the user interface, results indicative of the respective correlations.

2. The method of claim 1, wherein the second user input specifies a time step size and a time boundary.

3. The method of claim 1, wherein the second user input specifies a time period and number of time steps in the time range.

4. The method of claim 1, further comprising, prior to receiving the third user input, providing a recommendation of one or more metrics to be compared with the sequence of numbers.

5. The method of claim 1, wherein the results include information identifying a metric whose respective sequence of metric values has a highest correlation to the sequence of numbers.

6. The method of claim 1, wherein:
the results include a list of identifiers for multiple metrics; and
the list is ordered in accordance with a degree of correlation between each respective sequence of metric values and the sequence of numbers.

7. The method of claim 6, wherein identifiers in the list that correspond to metrics that have a correlation with the sequence of numbers that is above a correlation threshold are visually emphasized in the list.

8. The method of claim 1, wherein the sequence of numbers does not include any units.

9. The method of claim 1, wherein a user of the user interface, with knowledge of the key performance indicator, does not have direct access to a data set associated with the online social community.

10. A computing device, comprising:
one or more processors; and
memory;
one or more programs, wherein the one or more programs are stored in the memory and configured to be executed by the one or more processors, the one or more programs including instructions for:
- displaying a user interface for correlating a key performance indicator of a business entity with metrics for an online social community for the business entity, wherein the user interface includes a data entry region for a user to input values of the key performance indicator, a time grain region, and a metric region, and wherein the user interface has no direct access to key performance indicator data for the key performance indicator of the business entity;
- receiving, in the data entry region, a first user input to specify a sequence of numbers representing values of the key performance indicator for a range of consecutive time periods;
- receiving, in the time grain region, a second user input to specify the range of consecutive time periods and a size of the time periods;
- receiving, in the metric region, a third user input to select one or more metrics for the online social community; and
- in response to receiving the first, second, and third user inputs:
  - computing each of the selected one or more metrics for the specified range of time periods, aggregated according to the user specified size for the time periods, thereby forming a respective sequence of metric values corresponding to each of the selected one or more metrics;
  - for each of the selected one or more metrics, determining a respective correlation between the respective sequence of metric values and the sequence of numbers; and
  - providing, in the user interface, results indicative of the respective correlations.

11. The device of claim 10, wherein the second user input specifies a time step size and a time boundary.

12. The device of claim 10, wherein the second user input specifies a time period and number of time steps in the time range.

13. The device of claim 10, wherein the one or more programs include instructions for, prior to receiving the third user input, providing a recommendation of one or more metrics to be compared with the sequence of numbers.

14. A non-transitory computer readable storage medium storing one or more programs configured for execution by a computing device having one or more processors and memory, the one or more programs comprising instructions for:
- displaying a user interface for correlating a key performance indicator of a business entity with metrics for an online social community for the business entity, wherein the user interface includes a data entry region for a user to input values of the key performance indicator, a time grain region, and a metric region, and wherein the user interface has no direct access to key performance indicator data for the key performance indicator of the business entity;
- receiving, in the data entry region, a first user input to specify a sequence of numbers representing values of the key performance indicator for a range of consecutive time periods;
- receiving, in the time grain region, a second user input to specify the range of consecutive time periods and a size of the time periods;
- receiving, in the metric region, a third user input to select one or more metrics for the online social community; and
- in response to receiving the first, second, and third user inputs:
  - computing each of the selected one or more metrics for the specified range of time periods, aggregated according to the user specified size for the time periods, thereby forming a respective sequence of metric values corresponding to each of the selected one or more metrics;
  - for each of the selected one or more metrics, determining a respective correlation between the respective sequence of metric values and the sequence of numbers; and
  - providing, in the user interface, results indicative of the respective correlations.

15. The non-transitory computer readable storage medium of claim 14, wherein the second user input specifies a time step size and a time boundary.

16. The non-transitory computer readable storage medium of claim 14, wherein the second user input specifies a time period and number of time steps in the time range.

17. The non-transitory computer readable storage medium of claim 14, wherein the one or more programs further comprise instructions for providing a recommendation of one or more metrics to be compared with the sequence of numbers.

* * * * *